US006750866B1

(12) United States Patent
Anderson, III

(10) Patent No.: US 6,750,866 B1
(45) Date of Patent: Jun. 15, 2004

(54) METHOD AND SYSTEM FOR DYNAMICALLY FILTERING THE MOTION OF ARTICULATED BODIES

(75) Inventor: Frank C. Anderson, III, Redwood City, CA (US)

(73) Assignee: Realistic Dynamics, Inc., Redwood City, CA (US)

( * ) Notice: Subject to any disclaimer, the term of this patent is extended or adjusted under 35 U.S.C. 154(b) by 298 days.

(21) Appl. No.: 09/839,603

(22) Filed: Apr. 20, 2001

Related U.S. Application Data

(60) Provisional application No. 60/198,947, filed on Apr. 21, 2000.

(51) Int. Cl.[7] .............................................. G06T 15/70
(52) U.S. Cl. ........................................ 345/474; 345/473
(58) Field of Search ................................. 345/473, 474, 345/646, 935; 348/578; 386/50, 73; 382/276, 109, 293

(56) References Cited

U.S. PATENT DOCUMENTS 5,982,389 A    11/1999   Guenter et al. ............. 345/474

OTHER PUBLICATIONS

Isaacs et al., "Mixed methods for complex kinematic constraints in dynamic figure animation", The Visual Computer, 1988.*

Pandy, M.G., F.C. Anderson, et al. (1992). "A Parameter Optimization Approach for the Optimal Control of Large–Scale Musculoskeletal Systems." *Journal of Biomechanical Engineering* 114: 450–460.

Pandy, M.G., F.E. Zajac, et al. (1990). "An optimal control model for maximum–height jumping." *Journal of Biomechanics* 23(12): 1185–1198.

Popovic, Z. and A. Witkin (1999). "Physically Based Motion transformation." *SIGGRAPH99*.

Pratt, J., C.–M. Chew, et al. (2001). "Virtual Model Control: An Intuitive Approach for Bipedal Locomotion." *The International Journal of Robotics Research* 20(2): 129–143.

Risher, D.W., L.M. Schutte, et al. (1997). "The Use of Inverse Dynamics Solutions in Direct Dynamics Simulations." *Journal of Biomechanical Engineering* 119: 417–422.

Runge, C.R., F.E. Zajac, et al. (1995). "Estimating Net Joint Torques from Kinesiological Data Using Optimal Linear System Theory." *IEEE Transactions on Biomedical Engineering* 42(12): 1158–1164.

Taga, G. (1995). "A model of the neuro–musculo–skeletal system for human locomotion I. Emergence of basic gait." *Biological Cybernetics* 73: 97–111.

(List continued on next page.)

*Primary Examiner*—Mark Zimmerman
*Assistant Examiner*—Lance W. Sealey
(74) *Attorney, Agent, or Firm*—Gray Cary Ware & Freidenrich LLP

(57) ABSTRACT

In accordance with a set of embodiments of the present invention, a method can be used to filter the motion of a body or a system of articulated bodies so that the motion conforms to the laws of classical dynamics. Based on a specified set of kinematic inputs, on a dynamic model that represents the articulated bodies, and on a set of tunable filter parameters, an optimization-based inverse dynamics algorithm can be used to determine values of control variables and each time step during a forward simulation so that the model is driven toward the specified set of desired kinematics while at the same time potentially optimizing various other aspects of the motion. The embodiments may be useful in the areas of biomechanics, medicine, ergonomics, computer animation, or other areas where realistic motion generation is desired.

18 Claims, 10 Drawing Sheets

OTHER PUBLICATIONS

Witkin, A. (1988). "Spacetime Constraints." *Computer Graphics* 22(4): 159–168.

Yamaguchi, G.T. and F.E. Zajac (1990). "Restoring Unassisted Natural Gait to Parapalegics Via Functional Neuromuscular Stimulation: A Computer Simulation Study." *IEEE Transactions on Biomedical Engineering* 37(9): 866–902.

Zordan, V.B. and J.K. Hodgins (1999). "Tracking and Modifying Upper–body Human Motion Data with Dynamic Simulation." *Computer Animation and Simulation.*

An, K.N., B.M. Kwak, et al. (1984). "Determination of Muscle and Joint Forces: A New Technique to Solve the Indeterminate Problem." *Journal of Biomechanical Engineering* 106: 364–367.

Anderson, F.C. and M.G. Pandy (2001). "Static and dynamic optimization solutions for gait are practically equivalent." *Journal of Biomechanics* 34: 153–161.

Anderson, F.C. and M.G. Pandy (1999). "A Dynamic Optimization Solution for Vertical Jumping in Three Dimensions." *Computer Methods in Biomechanics and Biomedical Engineering* 2: 201–231.

Anderson, F.C., J.M. Ziegler et al. (1995). "Application of High–Performance Computing to Numerical Simulation of Human Movement." *Journal of Biomechanical Engineering* 117: 155–157.

Atkinson, L.V., P.J. Harley, et al. (1989). Chapter 8: Differentiation and Integration. *Numerical Methods with FORTRAN 77, A Practical Introduction*, Addison–Wesley Publishing Company, Inc.: 261–298.

Atkinson, L.V.,P.J. Harley, et al. (1989). Chapter 9: Ordinary Differential Equations. *Numerical Methods with FORTRAN 77, A Practical Introduction*, Addison–Wesley Publishing Company, Inc.: 299–370.

Baumgarte, J. (1972). "Stabilization of constraints and integrals of motion in dynamical systems." *Computer Methods in Applied Mechanics and Engineering* 1: 1–16.

Chao, E. Y.–S. and K. Rim (1973). "Application of optimization principles in determining the applied moments in human leg joints during gait." *Journal of Biomechanics* 6:497–510.

Crownshield, R.D. and R.A. Brand (1981). "A physiologically based criterion of muscle force prediction in locomotion." *Journal of Biomechanics* 14(11): 793–801.

Davy, D.T. and M.L. Audu (1987). "A dynamic optimization technique for predicting muscle forces in the swing phase of gait." *Journal of Biomechanics* 20(2): 187–201.

Fujimoto, Y. And A. Kawamura (1998). "Simulation of an Autonomous Biped Walking Robot Including Environmental Force Interaction." *IEEE Robotics & Automation Magazine* (June): 33–42.

Hatze, H. (1976). "the Complete Optimization of a Human Motion." *Mathematical Biosciences* 28:99–135.

Kaplan, M.L. and J.H. Heegaard (2001). "Predictive algorithms for neuromuscular contorl of human locomotion." *Journal of Biomechanics.*

Khatib, O. (1987). "A Unified Approach for Motion and Force Control of Robot Manipulations: The Operational Space Formulation." *IEEE Journal of Robotics and Automation* RA–3(1): 43–53.

Lewis, F.L., C.T. Abdallah, et al. (1993). Chapter 3: Computed–Torque Control. *Control of Robot Manipulators.* New York, Macmillan Publishing Company: 111–188.

Neptune, R.R. (1999). "Optimization Algorithm Performance in Determining Optimal Controls in Human Movement Analysis." *Journal of Biomechanical Engineering* 121:249–252.

* cited by examiner

METHOD AND SYSTEM FOR DYNAMICALLY FILTERING THE MOTION OF ARTICULATED BODIES

RELATED APPLICATIONS

This application claims priority under 35 U.S.C. §119(e), to U.S. patent application Ser. No. 60/198,947 entitled "Method and System For Dynamically Filtering the Motion of Articulated Bodies" by Anderson filed Apr. 21, 2000, which is assigned to the current assignee hereof and is incorporated herein by reference.

FIELD OF THE INVENTION

This invention relates in general to methods, data processing system readable storage media, and articles, and more particularly, to methods of filtering motion of a body, data processing system readable media having software code for carrying out those methods, and articles comprising output information related to a body, wherein the output information is generated using those methods.

DESCRIPTION OF THE RELATED ART

Computer models of the human body have been used since the early 1970's to estimate in-vivo quantities, such as muscle forces, which then and now cannot be measured except by invasive means. In the case of muscle forces, the difficulty arises because there are more muscles in the body than degrees of freedom, thus allowing multiple control strategies for a single observed body motion. As a result, an inverse dynamic analysis (i.e., an analysis that solves for the net muscular joint segmental accelerations derived from experimental measures) leads to an indeterminant set of equations for the muscle forces. Two approaches have been commonly employed to resolve this indeterminacy: static optimization and dynamic optimization.

Static optimization, based on the results of an inverse dynamic analysis, postulates that the net muscular joint moments are distributed across muscles so as to minimize a postulated performance criterion. The static optimization method is computationally feasible, but it has a number of shortcomings. First, in the static optimization technique, all quantities are treated as time independent variables. This assumption can lead to non-physiological predictions of muscle force because the dynamic properties of muscle are not taken into account. Second, the static optimization technique is highly dependent on the accurate collection and processing of kinematic data. The reason is that an inverse dynamic analysis requires twice differentiating displacement data to obtain accelerations, which amplifies any noise present in the displacement data. Third, because an inverse dynamics approach alone is taken, the static optimization process is not capable of generating novel motion.

Dynamic optimization is based on a forward dynamics approach. In a forward dynamics approach, one develops a detailed dynamic model of the musculoskeletal system and uses this model to execute computer-based simulations of movement that are driven by a set of actuator controls (e.g., joint torques, muscle excitation signals, and the like). Like static optimization, dynamic optimization postulates a performance criterion to resolve the indeterminant force distribution problem. However, performance criteria for dynamic optimization are time dependent and their evaluation is accomplished by numerically integrating the equations of motion over the duration of the simulation. As a result, dynamic optimization incurs great computational expense, so much so that relatively few dynamic optimization problems have been solved for complex activities like walking. Only recently, with the advent of parallel supercomputers, has it become feasible to solve large-scale dynamic optimization problems for human movement. Even with the use of parallel supercomputers, solutions can take more than 100 hours for motion that is less than one second in duration.

In the field of computer animation, obtaining realistic, life-like character motion is often an important objective. There are two general methods by which this task is currently approached: 1) motion capture and 2) key-framing. In motion capture, the motion of an actor or apparatus is digitally recorded (e.g., using markers and video cameras). Then, an inverse kinematic problem is often solved to drive a computer model through the same motion. This method has several drawbacks: 1) motion capture data frequently has errors, 2) motion capture sessions are typically limited to a small volume which requires that motion capture sequences be spliced together, and 3) it is sometimes not possible to use motion capture for certain animation sequences (e.g., locomotion of imaginary creatures, violent crashes, or space flight). In key-framing, an animator uses software to compose a series of animation frames, separated in time by some interval, which together comprise an animation sequence. The drawback of this method is that the realism of the sequence depends heavily on the experience and skill of the animator. For complex three-dimensional movements, an animator might be required to manually specify more than 30 variables per key-frame, and it is extraordinarily difficult to capture the subtle nuances exhibited by real-life characters.

Filtering techniques have been devised to reduce error in motion capture data, but these techniques typically omit knowledge of the dynamic properties of the character's body and of the actuators which drive the body. For example, inverse kinematic techniques have been implemented which can serve to reduce error in motion capture data when the motion of a character is constrained (e.g., a part of the body is known to be in contact with an obstacle or is known to articulate with another part of the body by a particular kind of joint, such as ball-and-socket). These same inverse kinematic techniques can also be used to reduce the burden on the animator when a key-framing methodology is used. However, in many instances an inverse kinematics technique is not sufficient for imbuing character animation with life-like dynamic realism.

Several physics-based animation techniques have been developed. Popovic and Witkin (SIGGRAPH 99, Los Angeles, Aug. 8–13, 1999) used an optimal control (or dynamic optimization) technique for improving the dynamic realism of character movement in computer animations. However, their technique is labor intensive, requires a high-level of skill from the animator, normally requires a simplified dynamic representation of the character, and can be computationally costly. Zordan and Hodgins (*Computer Animation and Simulation*, 1999) have employed proportional-derivative ("PD") control techniques to introduce dynamic realism into computer animation. While their technique appears to require less labor than that of Popovic and Witkin (1999), it does have several shortcomings. First, being a PD controller, the actuation of their dynamic models is based solely on error between the trajectory of the model and the desired kinematic trajectory, and therefore, has no feed-forward control. Without feed-forward control, non-physiological generalized forces are often demanded to make the dynamic model track the desired trajectories.

Second, because this approach does not use optimization when computing controls for the actuators, it cannot be used to reduce an indeterminate control problem to a determinant one and cannot be used to predict unmeasured or unspecified kinematic variables.

SUMMARY OF THE INVENTION

Methods can be used to filter the motion of a body so that the motion can be consistent with the laws of classical dynamics. Estimates of the generalized forces (i.e., forces and torques), which give rise to the filtered motion, can also be produced. In one embodiment, given a dynamic model that represents a system of articulated bodies and given a set of tunable filter parameters, an optimization-based inverse dynamics process can be used to compute a set of controls that drive a forward dynamic simulation toward a set of specified kinematic trajectories. To the extent that the actuators of the dynamic model are capable of applying the needed generalized forces, the specified kinematic trajectories can be reproduced. To the extent the actuators are not capable of applying the needed generalized forces, the specified kinematic trajectories can be filtered in a manner consistent with the dynamic properties of the articulated bodies.

The coupling of the optimization-based inverse dynamics algorithm with a forward dynamic simulation process has several benefits compared to prior art. In contrast to static optimization, the methods and system described herein 1) can account for the time dependent properties of the actuators, 2) can be less sensitive to errors in the specified kinematics, 3) and can generate novel motion. In contrast to dynamic optimization (i.e., optimal control methods for solving spacetime constraint problems), at least some of the embodiments of the present invention may require substantially less computation time. In contrast to other physics-based animation techniques, those embodiments may not require simplification of the dynamic model, does not require a high level of expertise from the animator, can reduce indeterminate control problems to determinant ones, and can predict unmeasured or unspecified kinematic variables. In addition, depending on how the filtering problem is phrased, the methods and system can be used to solve the inverse kinematics problem implicitly rather than depending on a prior explicit inverse kinematic solution. The methods and system can be useful in the areas of medicine, ergonomics, computer animation, or any other areas where it is of benefit for the motion of objects, real or imaginary, to follow the laws of classical dynamics.

In one set of embodiments, a method of filtering motion of a body can comprise accessing specified kinematics of the body, a dynamic property of the body, and a state of the body. The method can also comprise determining a control pertaining to an actuation of the body using an optimization-based inverse dynamics algorithm, the specified kinematics, and the dynamic property. The method can further comprise advancing the state in time using a forward dynamic simulator, the control, the dynamic property, and the state.

In another set of embodiments, a data processing system readable medium can have code embodied within it. The code can include instructions executable by a data processing system. The instructions may be configured to cause the data processing system to perform the methods described herein.

In other embodiments, an article can comprise an output information related to a body. More specifically, the article can comprise a data processing system readable medium and a code embodied within the data processing system readable medium. The code may include the output information. The output information may be generated by: accessing specified kinematics of the body, a dynamic property of the body, and a state of the body; determining a control pertaining to an actuation of the body using an optimization-based inverse dynamics algorithm, the specified kinematics, and the dynamic property; and advancing the state in time using a forward dynamic simulator, the control, the dynamic property, and the state.

The foregoing general description and the following detailed description are exemplary and explanatory only and are not restrictive of the invention, as claimed.

BRIEF DESCRIPTION OF THE DRAWINGS

The present invention is illustrated by way of example and not limitation in the accompanying figures, in which like references indicate the same elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

In accordance with a set of embodiments of the present invention, a method can be used to filter the motion so that it is more dynamically realistic. Input can comprise a complete or under-specified set of desired kinematic trajectories for a body or a system of articulated bodies, a dynamic model that represents the body or the system of articulated bodies, and a set of tunable filter parameters. Output information can comprise a complete set of filtered kinematic trajectories and any states of the dynamic model that were generated during the filtering process, such as muscle forces, muscle activation levels, motor torques, external forces, and the like.

The filtering can be accomplished by coupling an optimization-based inverse dynamics process with a forward dynamic simulation process. In particular, by minimizing a specified performance criterion and satisfying a set of optionally specified constraints, the optimization-based inverse dynamics process can generate a set of controls that drives the forward dynamic simulation process so that the dynamic model tracks the input set of desired kinematic trajectories and possibly so that some other aspect of performance is minimized or maximized (e.g., the sum of muscle stress, peak motor torques, etc.). The various embodiments of the present invention may have advantages over prior art methods including static optimization, dynamic optimization (i.e., optimal control methods for solving spacetime constraint problems), and physics-based computer animation techniques, or the like. The embodiments may be useful in the technological areas of biomechanics, medicine, ergonomics, computer animation, or other motion-related areas where motion is to follow the laws of classical dynamics and where estimates of the generalized forces (i.e., forces and torques) that give rise to a particular motion are desired.

Figure 1:
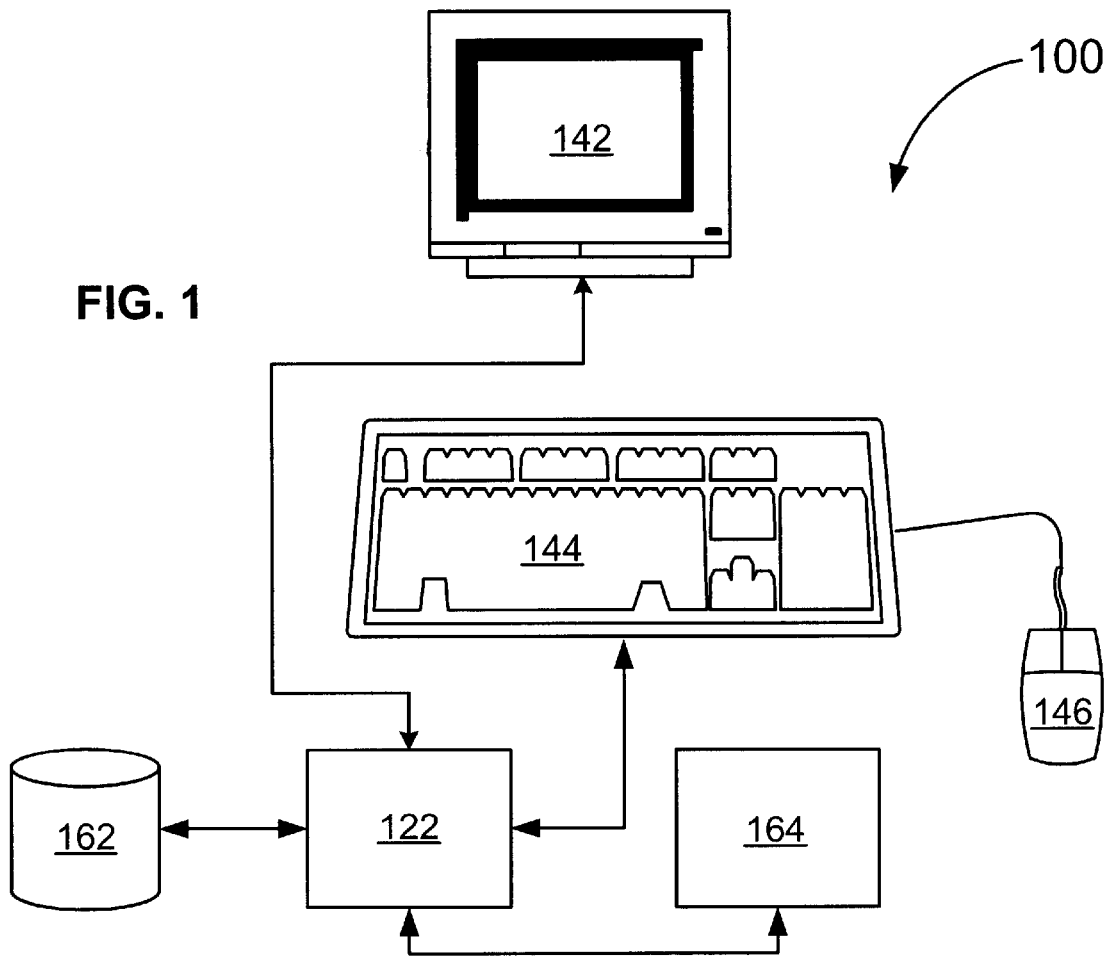
FIG. 1 includes an illustration of a schematic representation of a data processing system.

FIG. 1 includes an illustration of a data processing system 100 that includes a processor, which is bi-directionally coupled to input/output devices including a monitor 142, a keyboard 144, and a pointer device 146 (e.g., a mouse, a track ball, or the like). The pointer device can be connected to the keyboard 144 as shown in FIG. 1 or may be connected as a separate input/output device (not shown). The processor 122 is bi-directionally coupled to a storage device 162 (e.g., a hard disk, floppy diskette, CD-ROM, or other nonvolatile memory) and random access memory (RAM) 164 (e.g., static random access memory, dynamic random access memory, or the like). To execute a file, the processor 122 typically reads the file within the storage device 162 and loads it into RAM 164. The processor 122 principally controls the software program during its execution.

Figure 2:
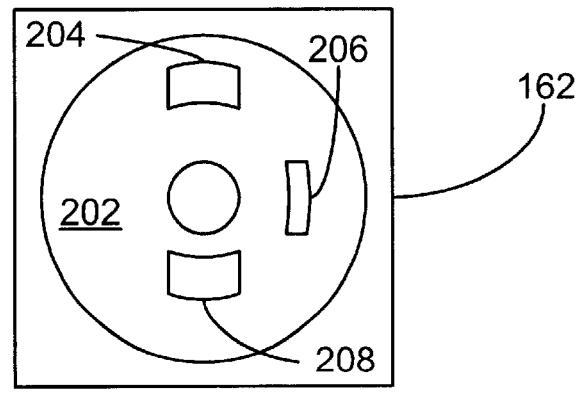
FIG. 2 includes an illustration of a data processing system storage medium including software code.

The methods described herein may be implemented in suitable software code that may reside within ROM, RAM 164, or the storage device 162. FIG. 2 illustrates a combination of software code elements 204, 206, and 208 that are embodied within a data processing system readable medium 202 of the storage device 162. In addition to the types of memories described above, the instructions in an embodiment may be contained on a data storage device with a different data processing system readable storage medium. Alternatively, the instructions may be stored as software code elements on a DASD array, magnetic tape, conventional hard disk drive, electronic read-only memory, optical storage device, CD ROM, a floppy diskette or other appropriate data processing system readable medium or storage device.

In an illustrative embodiment of the invention, the computer-executable instructions may be lines of compiled C++, Java, or other language code. Other architectures may be used. A server-client or other network architecture (not shown) could be used. Some or all of the functions of the data processing system 100 may be incorporated into a server computer or other computer remote to the data processing system 100.

Communications between the components within the data processing system 100 can be accomplished using electronic or optical signals. When a user (human) is at the data processing system 100, the device may convert the signals to a human understandable form when sending a communication to the user and may convert input from a human to appropriate electronic or optical signals to be used by the data processing system 100 or other computers.

Figure 3:
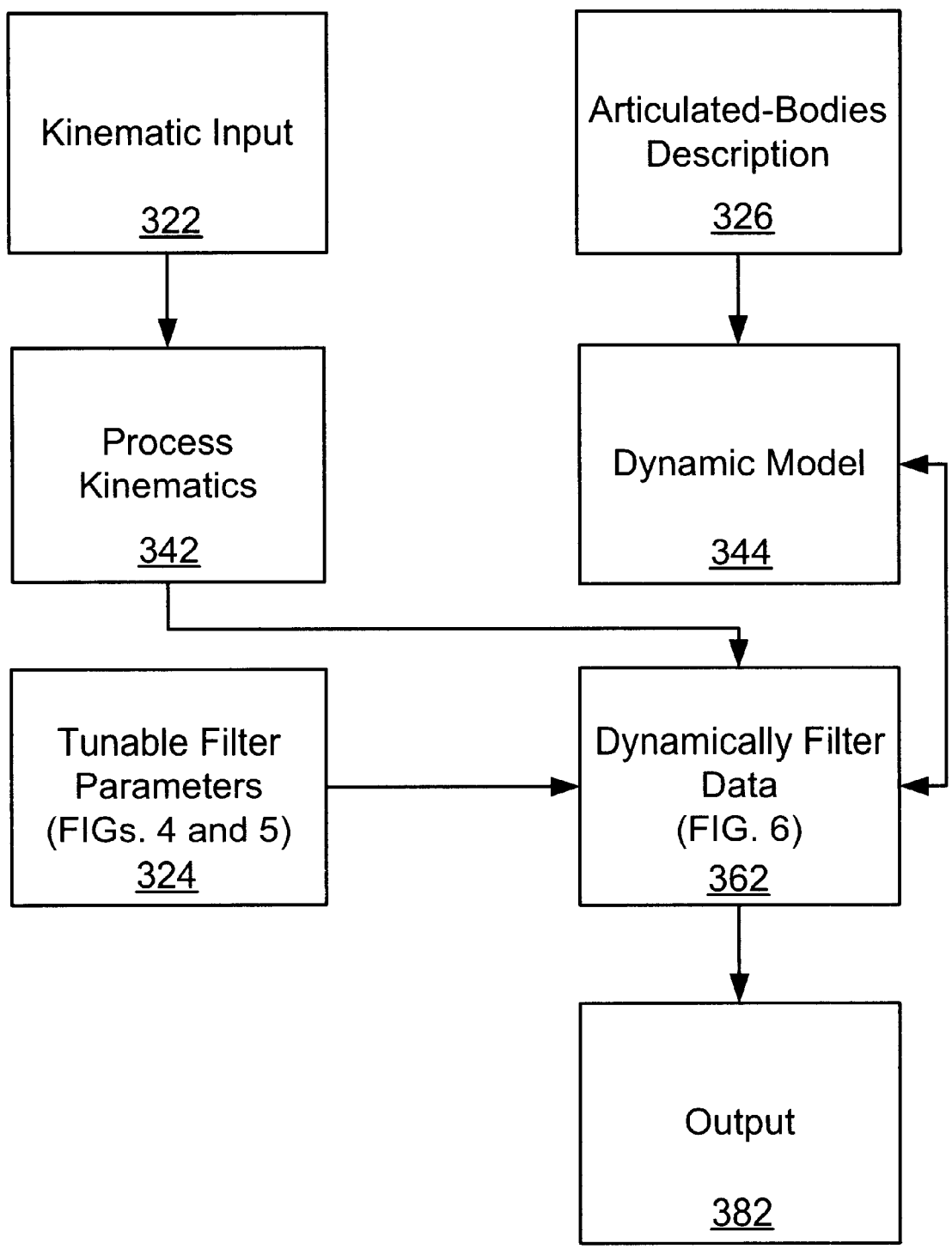
FIG. 3 includes an illustration of a system that can be used in filtering motion of articulated bodies in accordance with an embodiment.

Attention is now directed to a system that can be used in accordance with embodiments of the present invention. FIG. 3 includes a flow diagram showing a high level representation of a software configuration 300 for dynamically filtering the motions of articulated bodies. The configuration 300 can include a kinematic input (specified kinematics) 322, an articulated-bodies description 326, and tunable filter parameters 324. A user may interact with the data processing system 100 to define the data for these components. The kinematic input 322 can be accessed and processed to generate a set of curve fits. The articulated-bodies description 326 can be used to generate a dynamic model 344. The processed kinematics 342 and tunable filter parameters 324 are fed to a software component.362 to dynamically filter the data. The dynamic filter 362 accesses the dynamic model 344. The dynamic filter 362 can then generate output 382 that includes kinematic output which is similar to the kinematic input 322 but modified according to the tunable filter parameters 324 and the articulated-bodies description 326. In addition, the output 382 can include the generalized forces and auxiliary states which generated a particular kinematic output. Information regarding each of the blocks is given below in more detail.

Much of the discussion below uses examples from the science of biomechanics. However, the present invention is not limited to biomechanics. The principles described below can be used for many different physical or imaginary (computer animation) systems.

Before proceeding, it is useful to clarify some of the notational conventions used. An arrow over a symbol expresses a vector or an array of quantities. A double headed arrow over a symbol expresses a matrix of quantities. A subscript e on a symbol expresses that the quantity or quantities represented by the symbol is from the kinematic input 322. A subscript d on a symbol expresses that the quantity or quantities represented by the symbol is a desired processed kinematic input originating from process kinematics 342. If a generalized coordinate, or a time derivative thereof, or a function of generalized coordinates, or a time derivative thereof, does not have a subscript, it pertains to the dynamic model. Finally, in what follows, the term body (bodies) is meant to refer to the mathematical representation in the dynamic model of a physical or imaginary body (bodies).

The kinematic inputs 322 can include a set of curves (or sets of points that define a set of curves) that represent time histories of displacements or orientations. Some of the input displacements or orientations, $\vec{q}_e$, can correspond directly to a subset of the generalized coordinates of the dynamic model, $\vec{q}$. Other of the input displacements or orientations, $\vec{\Phi}_e$, which may be the position of a video marker in the inertial frame or the like, may not correspond directly to a subset of the generalized coordinates of the dynamic model, but rather correspond to functions of the generalized coordinates, $\vec{\Phi}(\vec{q})$.

As is known by skilled artisans, the choice of which generalized coordinates $\vec{q}$ are used to specify the configuration of a model is somewhat arbitrary and often based on convenience. A model should have as many generalized coordinates as it has degrees of freedom; however, one may also define more generalized coordinates than degrees of freedom. This line of discussion is pursued to point out that the distinction between $\vec{q}$ and $\vec{\Phi}(\vec{q})$ is a matter of definition. That is, one can suitably define a set of generalized coordinates, $\vec{q}$, for a model such that all $\vec{\Phi}(\vec{q})$ are eliminated. If this redefinition were performed, then the kinematic inputs 322 would be described entirely by $\vec{q}_e$. In practice, this approach may not be the most practical approach to filtering the kinematic inputs 322. Rather, one would likely choose an unconstrained and convenient $\vec{q}$ for the model and leave many of the kinematic inputs 322 expressed as functions of the generalized coordinates, $\vec{\Phi}_e(\vec{q})$. For example, one might choose a generalized coordinate of the model to represent hip flexion angle, $q^{hip}$, and ask the dynamic filter to track the inertial position a video marker placed on the thigh, $\Phi_e^{mark}(q^{hip})$ which is a function of $q^{hip}$. By posing the problem in this way, solving the inverse kinematic problem explicitly (i.e., using $\Phi_e^{mark}(q^{hip})$ to first infer $q_e^{hip}$) can be bypassed in favor of solving the inverse kinematic problem implicitly as a part of the dynamic filtering process.

A $\vec{q}_e$ specified by the user need not entirely specify all the generalized coordinates, $\vec{q}$, of the model. Data can be unspecified (i.e., omitted) for a $q_e$ over the entire time interval of a motion or for a portion or portions of the time interval of the motion. If $q_e$ is unspecified for a time interval, then the corresponding q is also considered to be unspecified for the time interval. Any number of $\vec{\Phi}_e(\vec{q})$ may be specified, including zero and including many more than the number of $\vec{q}$ of the dynamic model. A $\vec{\Phi}_e(\vec{q})$ may also be unspecified, but this does not imply that a q is unspecified.

In motion capture processes, leaving generalized coordinates unspecified is of benefit if certain displacements or orientations of the articulated bodies are difficult to measure accurately or if, for example, video markers become obscured. In key framing, leaving generalized coordinates unspecified is of benefit, for example, because it can reduce the amount of work demanded from the animator. If the generalized coordinates of the model are left unspecified, they are predicted by the dynamic filtering process.

The process kinematics component 342 can be used to curve fit $\vec{q}_e$ and $\vec{\Phi}_e$ in time to produce analytical expressions for the desired generalized coordinates $\vec{q}_d$ and the desired kinematic functions of the generalized coordinates $\vec{\Phi}_d(\vec{q})$. The curve fitting may be performed using any suitable mathematical representation including polynomials, Fourier series, linear interpolation, splines, or the like. The quantities $\vec{q}_d$ and $\vec{\Phi}_d(\vec{q})$ can be differentiated with respect to time (t) to estimate desired generalized speeds ($\dot{q}_d$, $\dot{\Phi}_d(\vec{q}, \dot{q})$) and desired accelerations ($\ddot{q}_d$, $\Phi_d(\vec{q}, \dot{q}, \ddot{q})$).

Unless stated otherwise, hereafter, the dependence of the $\vec{\Phi}$'s on the $\vec{q}$'s will often be omitted and treated as though it is understood. It is also noted that in the field of dynamics the relation between a generalized coordinate and a generalized speed need not be the one implied, namely that $\dot{q}=d\vec{q}/dt$. It is well known to skilled artisans in the field that many relationships between the generalized coordinates and speeds other than the one implied herein may be posed. However, for the sake of simplicity, the above simple relationship, namely $\dot{q}=d\vec{q}/dt$, is adopted throughout.

This differentiation of the kinematic input 322 can be carried out numerically or analytically. Having analytical expressions of $\vec{q}_d$, $\dot{q}_d$, $\ddot{q}$, $\vec{\Phi}_d(\vec{q})$, $\dot{\Phi}_d$, $\Phi_d$, and $\Phi_d$ can allow the kinematic information to be queried for any arbitrary time (t), which may be beneficial during integration that will be performed later, particularly if the integration involves advancing in time by variable step lengths. The $\vec{q}_d$, $\dot{q}_d$, $\ddot{q}_d$, $\vec{\Phi}_d(\vec{q})$, $\dot{q}_d$, and $\vec{\Phi}_d$ can be sent to the software component 362 as input for dynamic filtering.

The articulated-bodies description 326 can include information that may vary depending on the use. For the example in biomechanics, the articulated bodies may represent a leg of a human, and the information may include:

body moments of inertia and masses;

how the bodies are connected to one another in terms of joint types and locations of the joints with respect to the centers of masses of the bodies (the joint types generally determine which generalized coordinates $\vec{q}$ are used);

the mechanics of passive joint structures;

constraints on the generalized coordinates ($\vec{q}$);

force interaction with an external environment;

controls ($\vec{x}$)(e.g., muscle excitation levels);

actuator properties (e.g., mathematical representations of muscle mechanics and dynamics);

auxiliary states and their properties ($\vec{a}$) (e.g., muscle activation and fatigue states);

and the like.

More, fewer, or different parameters can be used depending on the system and the desired specificity chosen by the user. Information from the articulated-body description 326 can be used to generate the dynamic model 344 that is described in more detail later. Information generated from the dynamic model 344 can be used by the software component 362 that dynamically filters the data.

The controls, $\vec{x}$, generally pertain to the actuation of the articulated bodies as represented by the dynamic model. The controls may include generalized forces that are applied to the articulated bodies. However, the controls may also include variables which pertain to actuation of the articulated bodies more indirectly than generalize forces, such as a neural excitation level of a muscle, an electrical current or voltage sent to a motor, an extent of depression of an accelerator pedal of a vehicle, and the like.

The states of the articulated bodies ($\vec{y}$) as represented by the dynamic model can comprise all integrated quantities, which generally include the generalized coordinates ($\vec{q}$) and generalized speeds ($\dot{q}$), but may also include actuator generalized forces ($\vec{F}_A$), external generalized forces ($\vec{F}_E$), and any number of auxiliary states ($\vec{a}$) which are used in support of the simulation process, and the like. Thus, often the states take the form:

$$\vec{y} = \begin{bmatrix} \vec{q} \\ \dot{\vec{q}} \\ \vec{F}_A \\ \vec{F}_E \\ \vec{a} \\ \vdots \end{bmatrix}$$

The software component 362 also receives input from the tunable filter parameters 324. Some of the details of the tunable filter parameters 324 can be seen in FIGS. 4 and 5.

Figure 4:
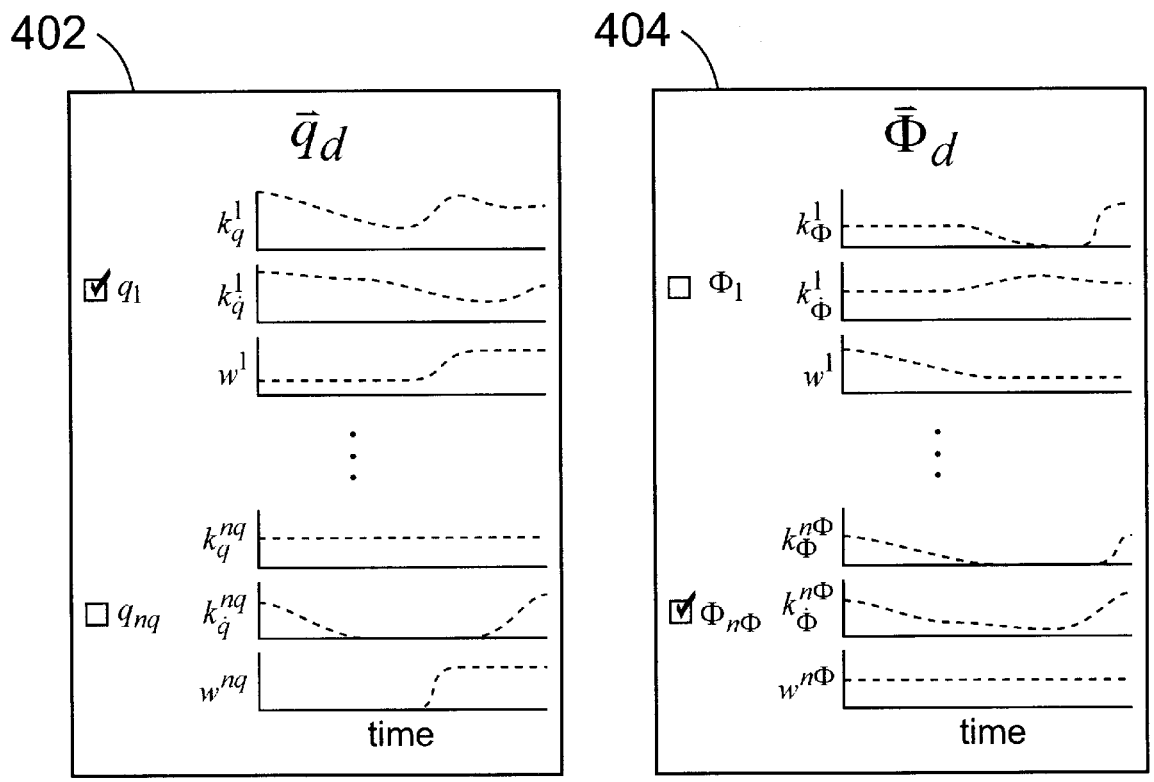
FIGS. 4–5 include illustrations of an implementation for using filter factors, weights, and bounds.

For each generalized coordinate, $q^i$, there can be a corresponding pair of correction factors, $k_q^i$ and $k_{\dot q}^i$, and a corresponding weight, $w_q^i$, as shown in section 402 in FIG. 4. Note that the correction factors and weights can change with time (horizontal axis). The higher $k_q^i$ the more aggressively tracking error between $q^i$ and $q_d^i$ is corrected. The higher $k_{\dot q}^i$ the more aggressively tracking error between $\dot q^i$ and $\dot q_d^i$ is corrected. Each weight can be used to determine which generalized coordinates are more important. The track switches in FIG. 4 can allow the tracking of generalized coordinates to be turned on and off as desired by the user. If the box is checked, the generalized coordinate can be tracked according to its correction factors and weight. If the box is not checked, the generalized coordinate may be left to vary freely during the dynamic filtering process as though it had not been specified.

Section 404 in FIG. 4 illustrates an entirely analogous set of filter parameters for each $\Phi_d^i$.

Figure 5:
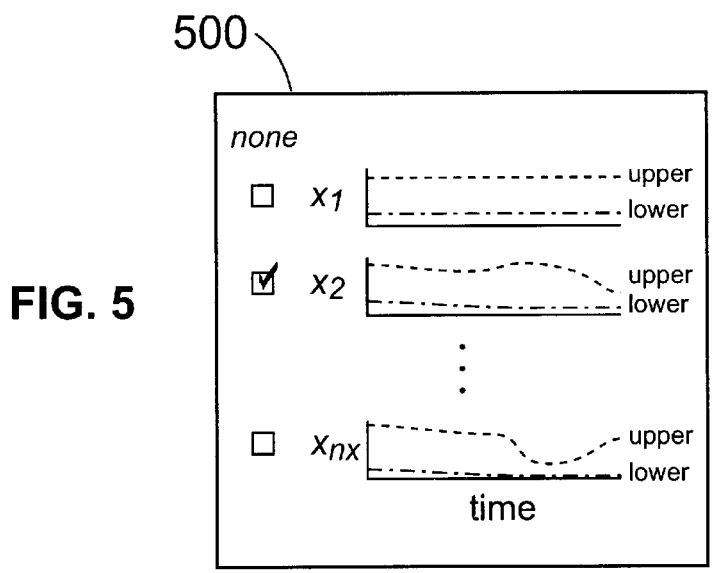

FIG. 5 includes a table 500 showing upper and lower bounds for the controls ($\vec x$). If a box in FIG. 5 is checked, its corresponding control will be entirely unbounded. Otherwise, the upper and lower limits can change over time (horizontal axis) as shown in FIG. 5.

Other parameters that may be specified include performance weights ($\vec{wx}$, $\vec{wa}$, etc.) used for terms in calculating the performance criterion, constraint weights ($\vec{wc}$), an integration tolerance (tol), and an optimization convergence criterion (eps). When tol and eps are large, the computations may be performed quickly but perhaps at the expense of accuracy. When tol and eps are small, the computations may take longer but the accuracy should improve. These other parameters are not shown in FIGS. 4 or 5, but they may be part of the tunable filter parameters 324 that can be used in dynamically filtering the data (block 362).

Figure 6:
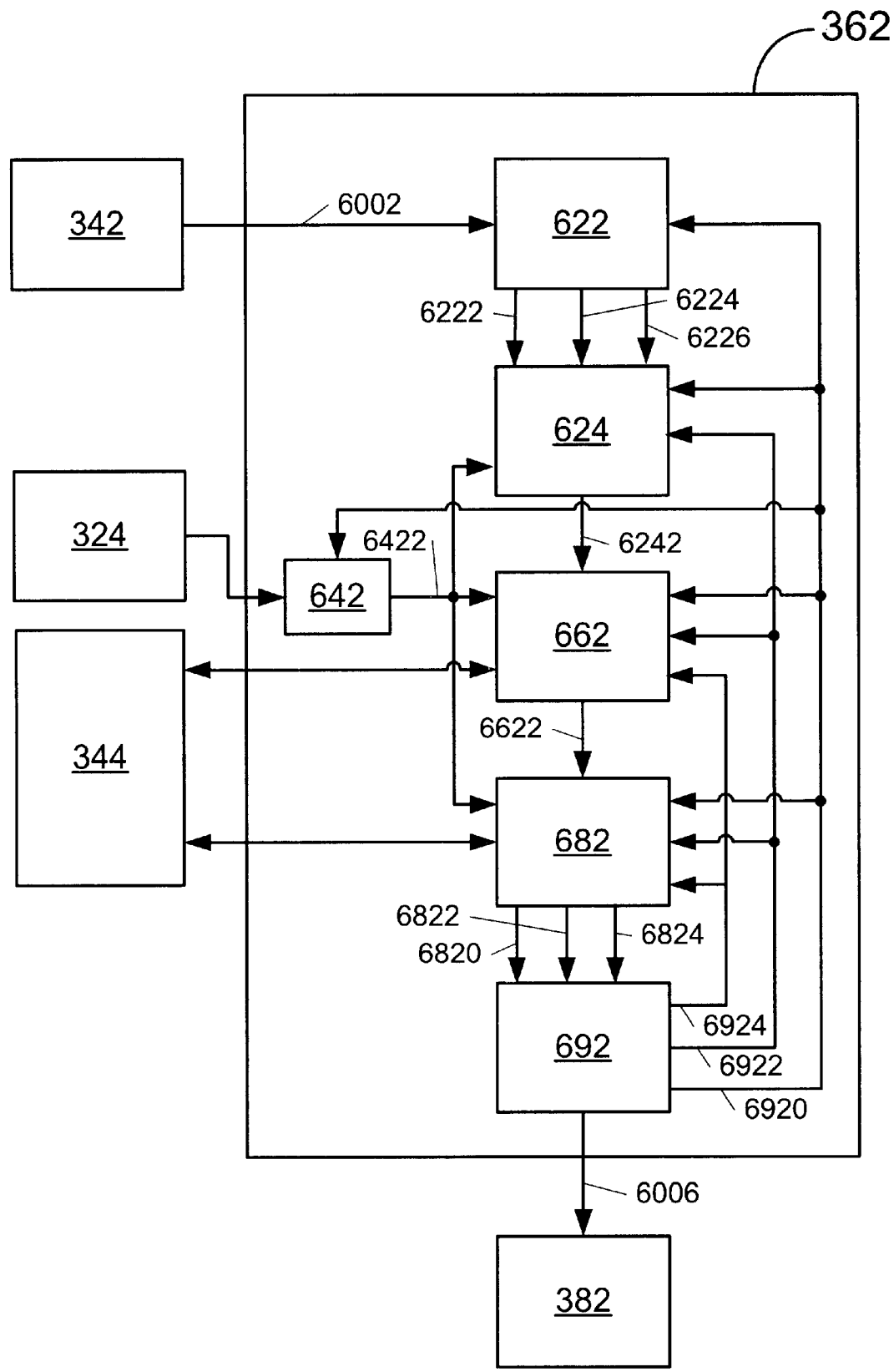
FIG. 6 includes an illustration of a dynamic filter module.

The dynamic filter component 362 is generally illustrated in FIG. 6. The dynamic filter component can access information from the processed kinematic inputs 342 and the tunable filter parameters 324, exchange information with the dynamic model 344, and send information to the output 382. As will become evident, the component 362 may perform functions iteratively. Many of the parameters used in the component 362 may be initialized on the first pass through the component 362.

Figure 6A:
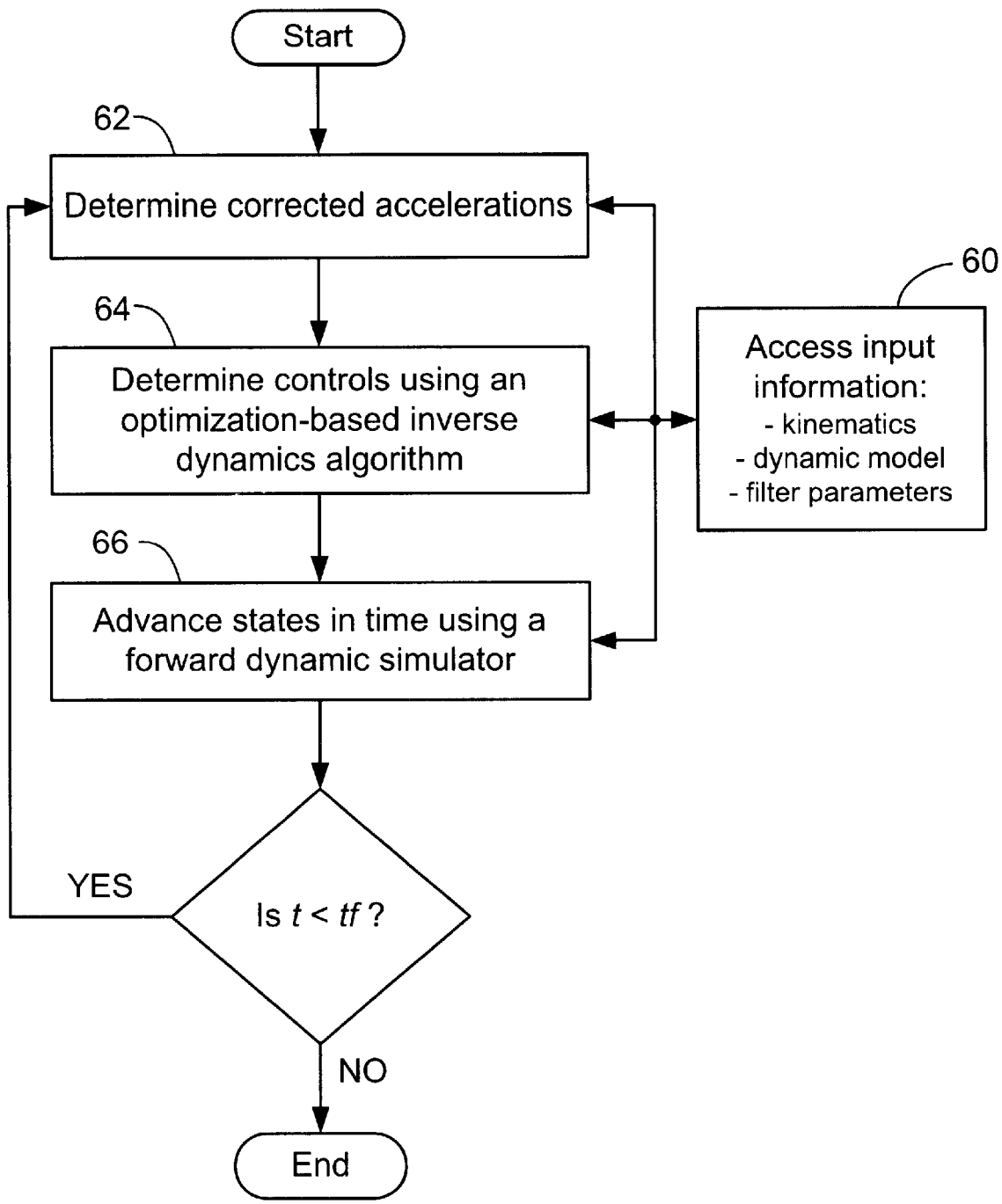
FIG. 6A includes a flow diagram of a portion of the software code.

FIG. 6A includes a flow diagram showing some of the acts performed by the component 362. The method can include accessing a variety of information as shown in block 60. The information may include the specified kinematics (such as positions, velocities, accelerations, orientations, angular velocities, angular accelerations, and the like), various dynamic properties available from the dynamic model 344 (such as dynamic properties of a body, states, forces, accelerations, and the like), and filter parameters (such as correction factors, weights, and the like). More or fewer variables may be accessed depending on the dynamic model and the user's desired specificity. The method can further include computing or otherwise determining corrected accelerations 62. The corrected accelerations ($\ddot q_c$) can be computed such that if achieved by the dynamic model, the model $\vec q$, $\dot q$, $\vec \Phi$, and $\dot \Phi$ will be driven toward $\vec q_d$, $\dot q_d$, $\vec \Phi_d$, and $\dot \Phi_d$.

The method can further include an optimization-based inverse dynamics process (block 64) that determines values of the controls ($\vec x$) that minimize or maximize a user specified performance criterion (p) and optionally satisfy an additional set of constraints ($\vec c$). The performance criterion and constraints are chosen so as to produce an $\vec x$ which, when input to the forward dynamic simulation process (block 66), results in beneficial filtering characteristics. The performance criterion and constraints may include any number of mathematical combinations of quantities such as tracking errors, actuator forces, external forces, auxiliary states, and the like. The optimization can be to minimize or maximize the value(s) of the performance criterion.

The method can also include forward dynamic simulation process which, based on the $\vec x$ determined at block 64 using a forward dynamic simulator, advances the states of the model, $\vec y$, in time (block 66). The processes outlined in FIG. 6A are stopped when the time is advanced to or beyond the specified final time (tf).

Referring back to FIG. 6, details regarding the data flow and software configuration of the component 362 are described in more detail. The processed kinematic inputs from block 342 can include the desired kinematics 6002 as functions of time. From this information as well as the current time t 6920, the component 622 can determine the desired kinematics at time t, including information 6222 (i.e., a combination of $\vec q_d$ and $\vec \Phi_d$), information 6224 (i.e., a combination of $\dot q_d$ and $\dot \Phi_d$), and information 6226 (i.e., a combination of $\ddot q_d$ and $\ddot \Phi_d$). The information 6222, 6224, and 6226 can be sent to and received by the acceleration correction component 624.

From the tunable filter parameters from block 324 and the current time t 6920, the component 642 can determine the current values of any tunable filter parameters 6422 at time t and send this information to the acceleration correction component 624, the optimization-based inverse dynamics component 662, and the forward dynamic simulation component 682.

The acceleration correction component 624 can access or receive information 6222 6224, and 6226 from component 622, and information 6422 from component 642, as well as the current values of the model states $\vec y$ 6922 from a feedback loop coming from component 692. From $\vec y$, $\vec q$ and $\dot q$ can be extracted and used together with correction factors $\vec k_q$, $\vec k_{\dot q}$, $\vec k_\Phi$, and $\vec k_{\dot\Phi}$ from 6422 and information 6222, 6224, and 6226 from 622 to compute corrected accelerations $\ddot q_c$ and $\ddot \Phi_c$. A common implementation follows:

$$\ddot{\vec q}_c = \ddot{\vec q}_d + \vec k_{\dot q}(\dot{\vec q}_d - \dot{\vec q}) + \vec k_q(\vec q_d - \vec q) \text{ and}$$

$$\ddot \Phi_c = \ddot \Phi_d + \vec k_{\dot\Phi}(\dot\Phi_d - \dot\Phi) + \vec k_\Phi(\vec \Phi_d - \vec \Phi).$$

Other formulations for computing $\ddot q_c$ and $\ddot \Phi_c$ are likely possible. The output from the accelerator correction component 624 includes information 6242, $\ddot q_c$ and $\ddot \Phi_c$, that can be sent to and received by the optimization-based inverse dynamics component 662.

The optimization-based inverse dynamics component 662 can be used at each time step t to determine or update the controls ($\vec x$) 6622 to optimize, including evaluate, a performance criterion (p) while satisfying any specified constraints ($\vec c$). To accomplish this task, the optimization based inverse dynamics component 662 may also receive some information 6422 from the query parameters component 642. Information 6422 may, for example, include various weight factors, a convergence criterion, and other similar filter parameters. The component 662 may also receive the current time (t) 6920, the current states ($\vec y$) 6922, and the size of the last time increment (dt) 6924 from the time incrementing component 692. The details of the component 662 are described later. The controls ($\vec{x}(t)$) 6622 can be sent to and received by the forward dynamic simulator 682.

The forward dynamic simulator 682 can be used to advance the states $\vec{y}$ forward in time from the current time t to a new time t+dt. To accomplish this advancement, the forward dynamic simulator may implement any number of conventional integration techniques (e.g., Runge-Kutta, Runge-Kutta-Feldberg, algebraic integrators, implicit integrators, or the like). In addition to the controls ($\vec{x}$) 6622, the simulator 682 may also receive the time (t) 6920, the states ($\vec{y}$) 6922, and time increment (dt) 6924 from the time incrementing component 692. If integration is accomplished numerically, the simulator 682 advances the states to t+dt using time derivatives of $\vec{y}$ computed by making calls to the dynamic model 344. The details of the component 682 are described later. The output of the simulator 682 can include t 6820, new states $\vec{y}$(t+dt) 6822, and the time increment dt 6824 which can be sent to and received by the time incrementing component 692.

The time incrementing component 692 may serve different functions. The component 692 can increment the time, so that the current time is changed from t to t+dt. If the incremented time is less than the final time of the motion, the process is allowed to continue. Otherwise the process is stopped. If the process is continued, the values from the simulator 682 are assigned to the current values ($\vec{y}(t)=\vec{y}$(t+dt), etc.). The new current time (t) 6920, the new current states 6922, and time increment (dt) 6924 can be sent back to the components as shown in FIG. 6.

At the end of the process or for each time increment, the controls ($\vec{x}$) and states ($\vec{y}$) may be stored in RAM 164 or storage device 162 of the data processing system 100. When the finishing time is reached, information 6006 may be sent as output 382. The output 382 may be sent to the monitor 142, a printer (not shown in FIG. 1) or stored on storage device 162 (if intermediate information is stored in RAM 164) or a remote storage device via a network (not shown). In some embodiments, the output information related to the body may be part of an article. The article can comprise a data processing system readable medium and a code embodied within the data processing system readable medium. The code would include the output information that is generated by the methods described herein. At this point, the process can be complete or run again for a different time period or a different system.

Figure 7:
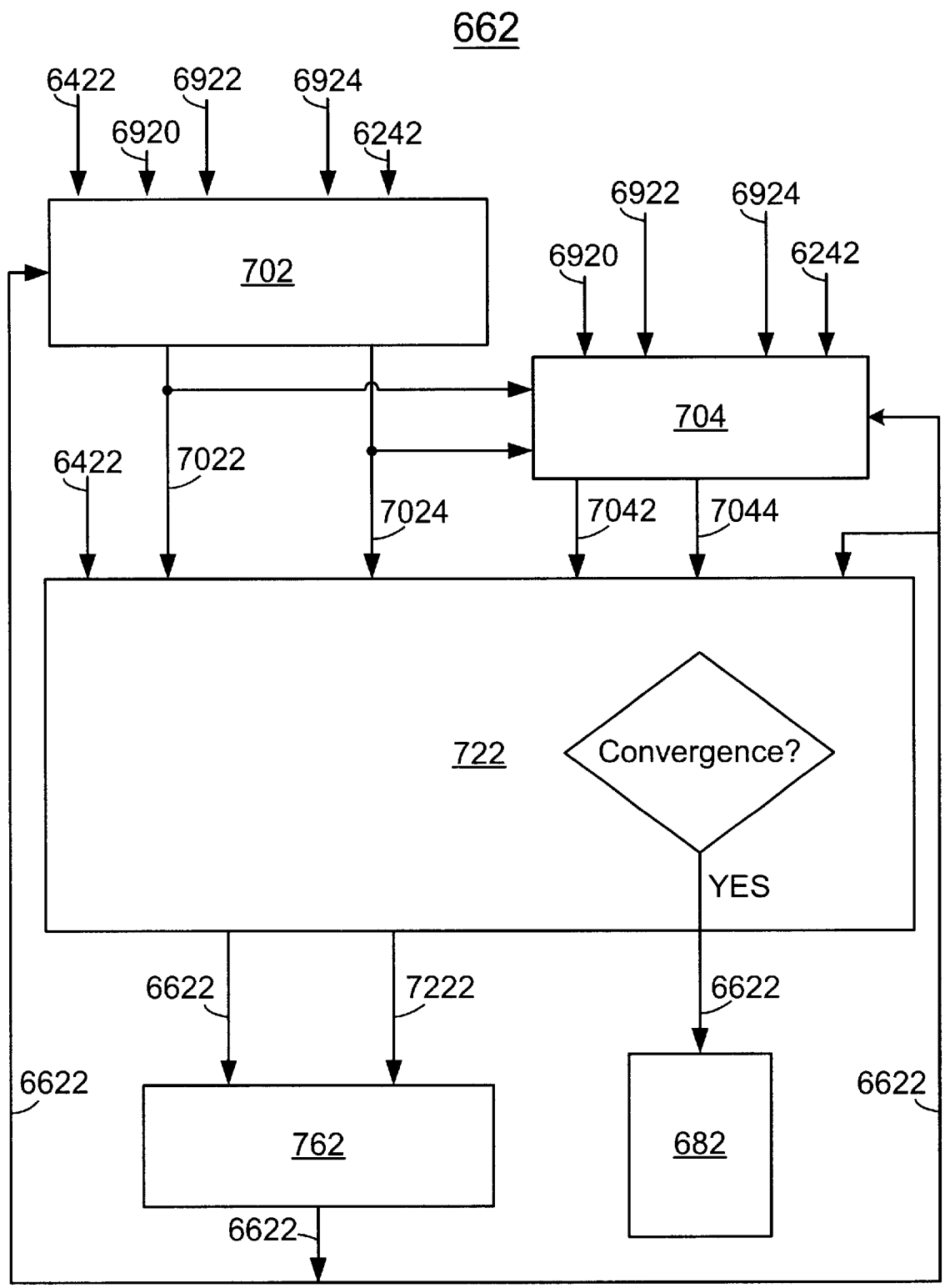
FIG. 7 includes an illustration showing an implementation of using an optimizing unit.

Attention is now directed to details that may be performed by the optimization-based inverse dynamics component 662. Referring to FIG. 7, data flow and some of the parts of component 662 are described. The optimization-based inverse dynamics algorithm embodied in component 662 as described here utilizes a gradient-based optimization approach. Other optimization approaches may also be employed if desired (e.g., simplex, simulated annealing, etc.). The inputs may include controls ($\vec{x}$) 6622, time (t) 6920, states ($\vec{y}$) 6922, time increment (dt) 6924, and the corrected accelerations ($\ddot{q}_c$) 6242. This information is used by the performance and constraint unit 702 and the performance and constraint differentiator 704. Additional input can include filter parameters 6422 that can include, for example, a convergence criterion (eps), described below. More details of the unit 702 are described later. Unit 702 calculates a performance criterion (p) 7022 and constraints ($\vec{c}$) 7024. The performance criterion 7022 and the constraints 7024 can be sent to and received by the differentiator 704 and the optimizer 722.

The differentiator 704 can be used to compute derivatives of the performance criterion with respect to the controls ($\overrightarrow{dpdx}$) 7042 and derivatives of the constraints with respect to the controls $$\overrightarrow{dcdx}) \ 7044.$$

These derivatives can be computed analytically or numerically by conventional methods. The derivatives 7042 and 7044 can be sent to and received by the optimizer 722.

Based on the quantities 7022, 7024, 7042, and 7044, and potentially other parameters that are commonly used by optimization algorithms, the optimizer 722 can determine the direction in which the controls ($\vec{x}$) should be changed in order to minimize or maximize p 7022 while satisfying the constraints $\vec{c}$ 7024. A vector $\overrightarrow{dxda}$ 7222 represents this direction. Based on quantities that may include direction 7222, the optimizer computes a convergence factor that can be compared to the input convergence criterion eps. Commonly if the computed convergence factor is not less than eps, the direction 7222 can be sent to and received by a line searching unit 762. The line search unit 762 can determine an step length α in direction 7222 according the formula $$\vec{x} = \vec{x} + \alpha \cdot \overrightarrow{dxda}$$

so that $\vec{x}$ is moved closer to an optimal solution. When $\vec{x}$ is updated in this manner, the performance criterion 7022 and constraints 7024 are recomputed based on the new values of $\vec{x}$. The process continues iteratively until the computed convergence factor is less than eps, at which point the controls 6622 are sent to the simulator 682.

Figure 8:
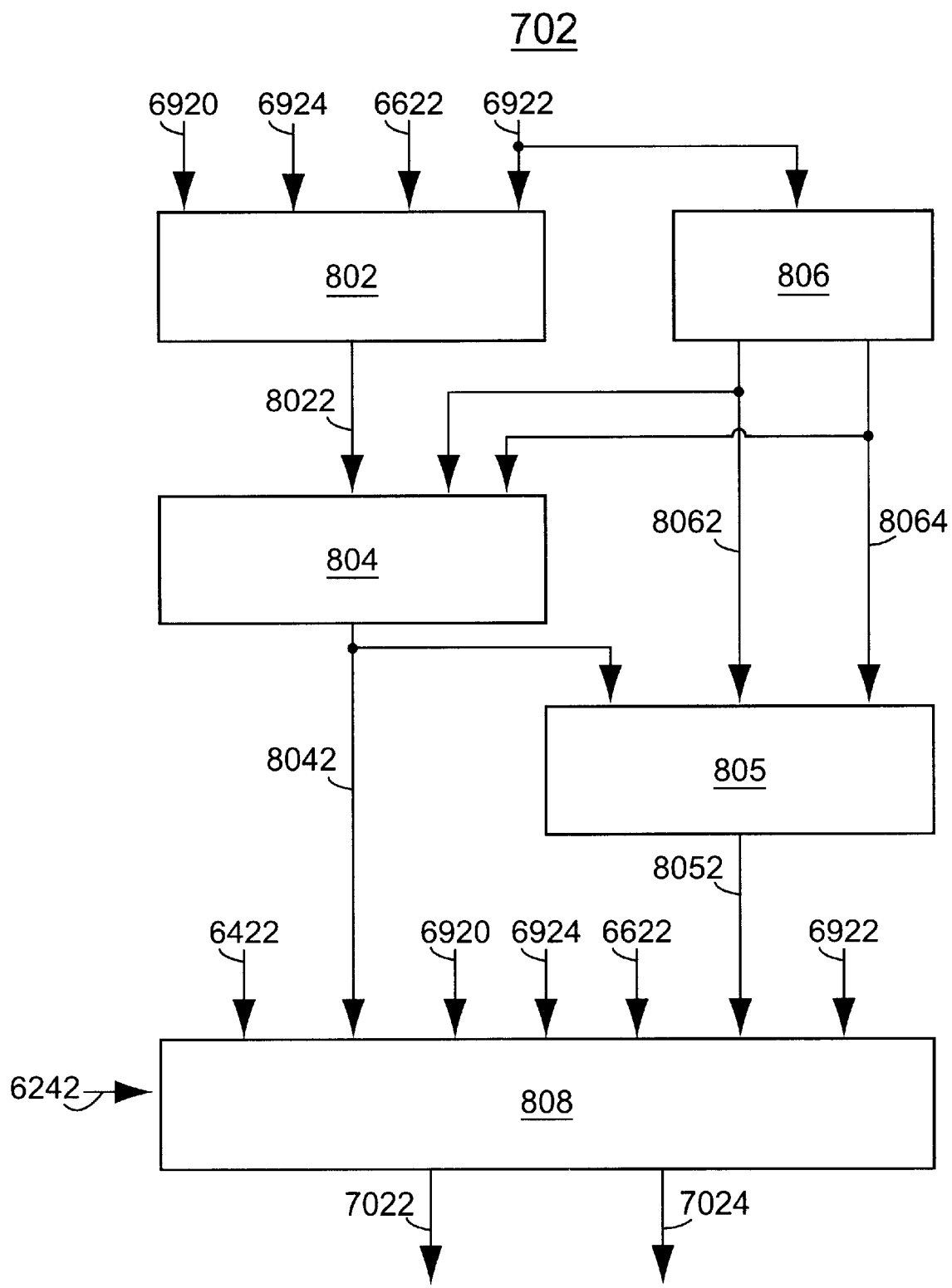
FIGS. 8 and 9 include illustrations showing details of portions of the optimizing unit.

Attention is now directed to the performance and constraints unit 702, a portion of which is illustrated in FIG. 8. The dynamic model 344 can be used to determine the accelerations of a body. In this embodiment, the model 344 can be used to calculate those accelerations in order to evaluate a performance criterion and constraints. The equations of motion can be represented in the following form, from which the accelerations can be calculated:

$$\ddot{\vec{q}} = \{I^{-1}(\vec{q})\}*\{C(\vec{q},\dot{\vec{q}}^2)+G(\vec{q})+\vec{F}_A(\vec{q},\dot{\vec{q}},\vec{a})+\vec{F}_E(\vec{q},\dot{\vec{q}})\},$$

where:

$I^{-1}(\vec{q})$ can be an inverse of the system mass matrix;

$C(\vec{q},\dot{q}^2)$ can be a vector of generalized active forces arising from centripetal forces;

$G(\vec{q})$ can be a vector of generalized active forces arising from gravitational forces;

$\vec{F}_A(\vec{q},\dot{q},\vec{a})$ can be a vector of generalized active forces arising from actuators; and $\vec{F}_E(\vec{q},\dot{q})$ can be a vector of generalized active forces arising from interaction with the external environment.

The actuator forces can be used in the equation and may be thought of an "internally generated" forces. In biomechanics, muscle forces may be examples of these actuator forces. The external environment term can account for forces that occur outside the system beyond centripetal and gravitational effects. External environmental forces can include forces due to fluids (e.g., wind, waves, etc.) or impacts with external objects. The external environment forces can be a function of the generalized coordinates and speeds.

Returning to FIG. 8, a generalized force calculation unit 802 can be used to determine the generalized forces 8022, which includes the actuator forces and the external forces. Inputs can include time 6920, states 6922, time increment 6924, and controls 6622. The details of the generalized force calculation are described later. The generalized forces can be sent to and received by the acceleration calculation unit 804.

In addition to the generalized forces 8022, the acceleration calculation unit 804 receives the generalized coordinates $\vec{q}$ 8062 and the generalized speeds $\dot{q}$ 8064, which can be extracted from the states $\vec{y}$ 69226 using an extractor unit 806. Note that $\vec{q}$ and $\dot{q}$ are just some of the information within the states. From the quantities 8022, 8062, and 8064, the accelerations $\ddot{q}$ 8042 can be calculated using the equations of motion of the dynamic model 344. Equations of motion can be generated by hand or by using a number of commercially available software programs, such as SD/Fast by Symbolic Dynamics, Inc., ADAMS by Mechanical Dynamics, Inc., or Autolev by Kane and Levinson.

The set of $\Phi$ corresponding to $\vec{\Phi}_A(\vec{q})$ can be evaluated using the kinematic computation unit 805, based on the generalized coordinates 8022, speeds 8064, and accelerations 8042.

A performance calculation unit 808 can be used to evaluate a performance criterion and constraints. In addition to receiving $\ddot{q}$ 8042 and $\Phi$ 8052, the unit 808 may access the weights (e.g., $W_q$ and $W_x$) from the tunable filter parameters and is shown as 6422 in FIG. 8. The unit 808 may access any $\ddot{q}_c$ and any $\Phi_c$ from information 6242 from the output of the acceleration correction unit 624. The unit 808 also has access to the time 6920, the states 6922, and the time increment 6924. From all these quantities a range of forms of performance criteria and a range of forms of constraints can be calculated.

An important consideration in the choice of the forms of p and $\vec{c}$ is to drive the trajectory of the model ($\vec{q}$, $\dot{q}$) toward the desired kinematics ($\vec{q}_d$, $\dot{q}_d$, $\vec{\Phi}_d$, $\dot{\Phi}_d$). This consideration can be stated as follows: solve for $\vec{x}$ so that, when $\vec{x}$ is input to the forward dynamic simulator (block 682) and the states are advanced in time by a time step, $\ddot{q}$ is approximately $\ddot{q}_c$ and $\Phi$ is approximately $\Phi_c$ over that time step. Other considerations can impact the choice of the forms of p and $\vec{c}$. These other considerations might include minimizing or maximizing actuator efforts, energy consumption, joint contact forces, acceleration of an unspecified generalized coordinate, and the like. When multiple considerations are expressed in p or in a combination of p and $\vec{c}$, the balance between the considerations is generally achieved with weight factors which can come from input 6422. For example, when the following performance criterion is minimized it can have the effect of tracking the desired trajectories closely while at the same time minimizing a measure of actuator effort:

$$p = \underbrace{\sum_{i=1}^{nx} w_x^i(x^i)^2}_{\substack{\text{minimize} \\ \text{actuator} \\ \text{effort}}} + \underbrace{\sum_{i=1}^{nq} w_q^i(\ddot{q}_c^i - \ddot{q}^i)^2 + \sum_{i=1}^{n\Phi} w_\Phi^i(\Phi_c^i - \Phi^i)^2}_{\text{track trajectories closely}},$$

where $w_x^i$, $w_q^i$ and $w_\Phi^i$ are weight factors used to weight each consideration.

In the event that a $\ddot{q}^j$ is unspecified at a point in time or its tracking switch has been unchecked, the immediately preceding equation for p should omit the $(\ddot{q}_c^i - \vec{q}^i)$ term from the summation for i=j. Numerous standard programming techniques can be used to accomplish this. The analogous procedure holds for an unspecified $\vec{\Phi}^j$.

The forms p and $\vec{c}$ can be posed in numerous ways. One phrasing of the parameter optimization problem might be appropriate for generating dynamically realistic computer animations, for which the animation artist wishes only to specify a few of the generalized coordinates through keyframing or motion capture. A different performance criterion could be used during medical simulations, which instead of minimizing the magnitudes of the unspecified accelerations, the magnitudes of the generalized forces (e.g., muscle forces) during a task like standing from a squat position can be minimized. Numerous variations can exist and are appreciated by skilled artisans after reading this specification.

After the calculation of the performance criterion 7022 and constraints 7024, these quantities can be sent to and received by the performance and constraint differentiation unit 704 and the optimizer 722 in FIG. 7.

Figure 9:
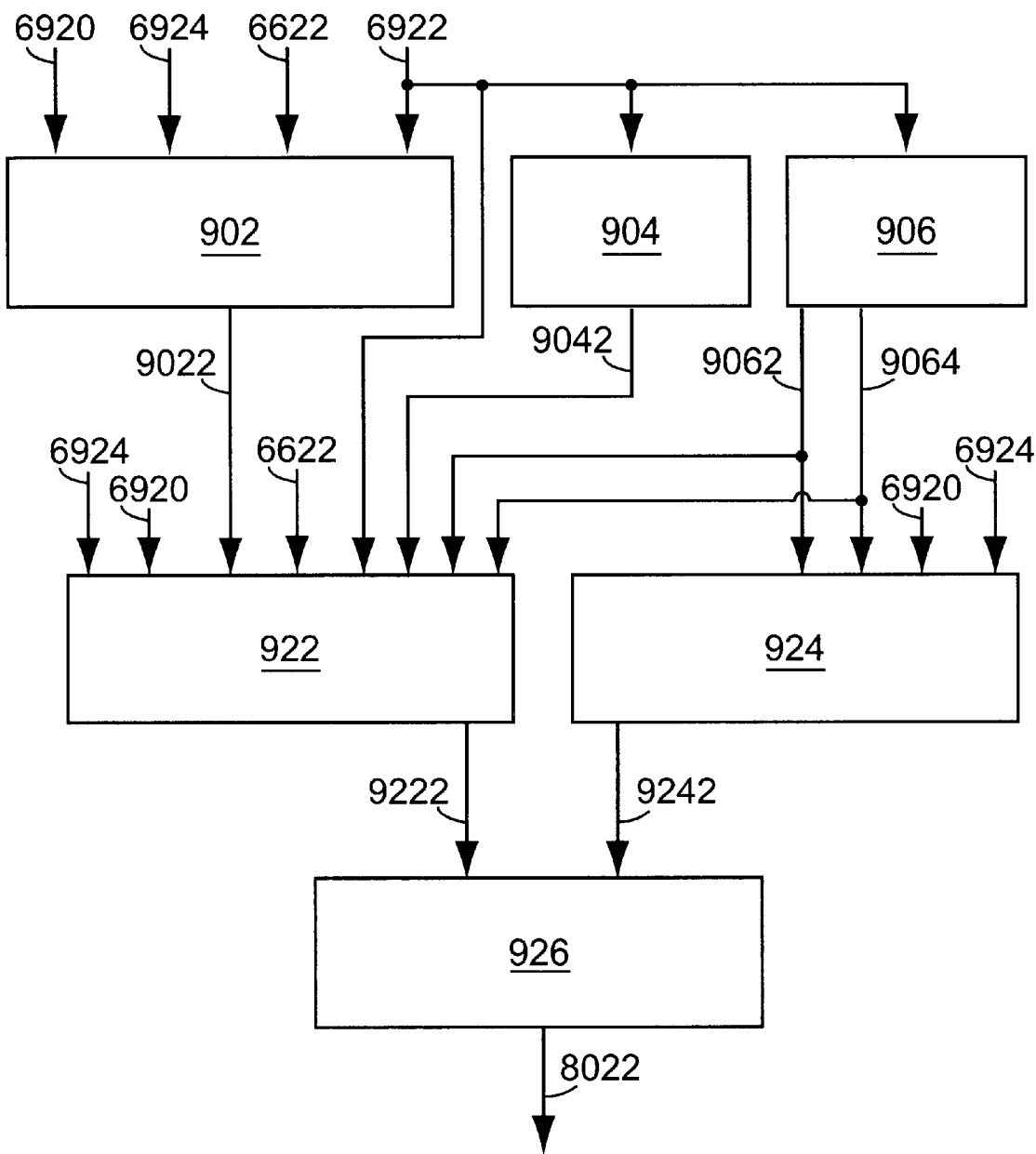

The generalized forces unit 802 is illustrated in FIG. 9. Inputs to an auxiliary state equation unit 902 may include time 6920, states 6922, time increment 6924, and controls 6622. The auxiliary state equation unit 902, the equations of which derive from the dynamic model 344, may be used to represent factors such as muscle activation, muscle fatigue, degradation of a motor, or the like. The calculations can be performed using any number of conventional techniques. The unit approximates auxiliary states $\vec{a}(t+dt)$ 9022 that can be sent to and received by the actuator state equation unit 922.

The states 6922 can include information regarding forces from actuators $\vec{F}_A(t)$, displacements $\vec{q}(t)$, speeds $\dot{q}(t)$, and the like. Extracting unit 904 can be used to separate out forces $\vec{F}_A(t)$ 9042 from the states, and extracting unit 906 can be used to separate out the displacements $\vec{q}(t)$ 9062 and velocities $\dot{q}(t)$ 9064 from the states.

The actuator state equation unit 922, the equations of which derive from the dynamic model 344, allows an estimation of the actuator forces at time t+dt (i.e., $\vec{F}_A(t+dt)$) 9222. These actuator forces can include muscle forces, motor torques and the like. The actuator state unit may receive the forces $\vec{F}_A(t)$ 9042, the displacements $\vec{q}(t)$ 9062, velocities $\dot{q}(t)$ 9064, the auxiliary states $\vec{a}(t+dt)$ 9022, controls 6622, time 6920, and the time increment 6924.

External forces are addressed by the external forces unit 924, the equations of which derive from the dynamic model 344. The inputs to unit 924 may include displacements $\vec{q}(t)$ 9062, velocities $\dot{q}(t)$ 9064, time 6920, and time increment 6924. That information can be used to approximate the external forces at time t+dt ($\vec{F}_E$(t+dt) 9242). The information from units 922 and 924 can be concatenated by the concatenating unit 926 to give the generalized forces $\vec{F}$(t+dt) 8022.

When determining controls using the optimization-based inverse dynamic algorithm (embodied in 662), it is of benefit to estimate the generalized forces $\vec{F}$ at t+dt rather than at t for several reasons. First, it can allow for a better estimate of the accelerations that will occur when the states are advanced in time from t to t+dt, which can improve computational speed and can yield more realistic estimates of $\vec{F}$. Second, it can allow for better control of the center of mass for a system of articulated bodies which can be important for balance and navigation.

There are numerous standard methods which can be used to estimate $\vec{F}$(t+dt) in a computationally efficient manner. In the case of simple relationships between $\vec{F}$ and the states (e.g., linear springs), the problem can occasionally be solved analytically. In the case of more complicated relationships, the dependence of $\vec{F}$ on the states can be linearized and then perhaps solved analytically. Another option is using low-order integration (e.g., forward Euler, $2^{nd}$ order Runge-Kutta). The simplest approximation is to assume that $\vec{F}$(t)= $\vec{F}$(t+dt), and this assumption is adequate for implementing a working embodiment of the invention.

The following illustrates a simple analytical example. Let the generalized force f be characterized by the following differential equation:

$$df/dt=(x-f)/k,$$

where x is a control and k is a constant. This equation is a separable and can be integrated analytically if x is also assumed to be constant over the interval of integration. The solution is:

$$f(t+dt)=x-(x-f(t))\exp[-dt/k],$$

where dt is taken as the interval of the integration.

Figure 10:
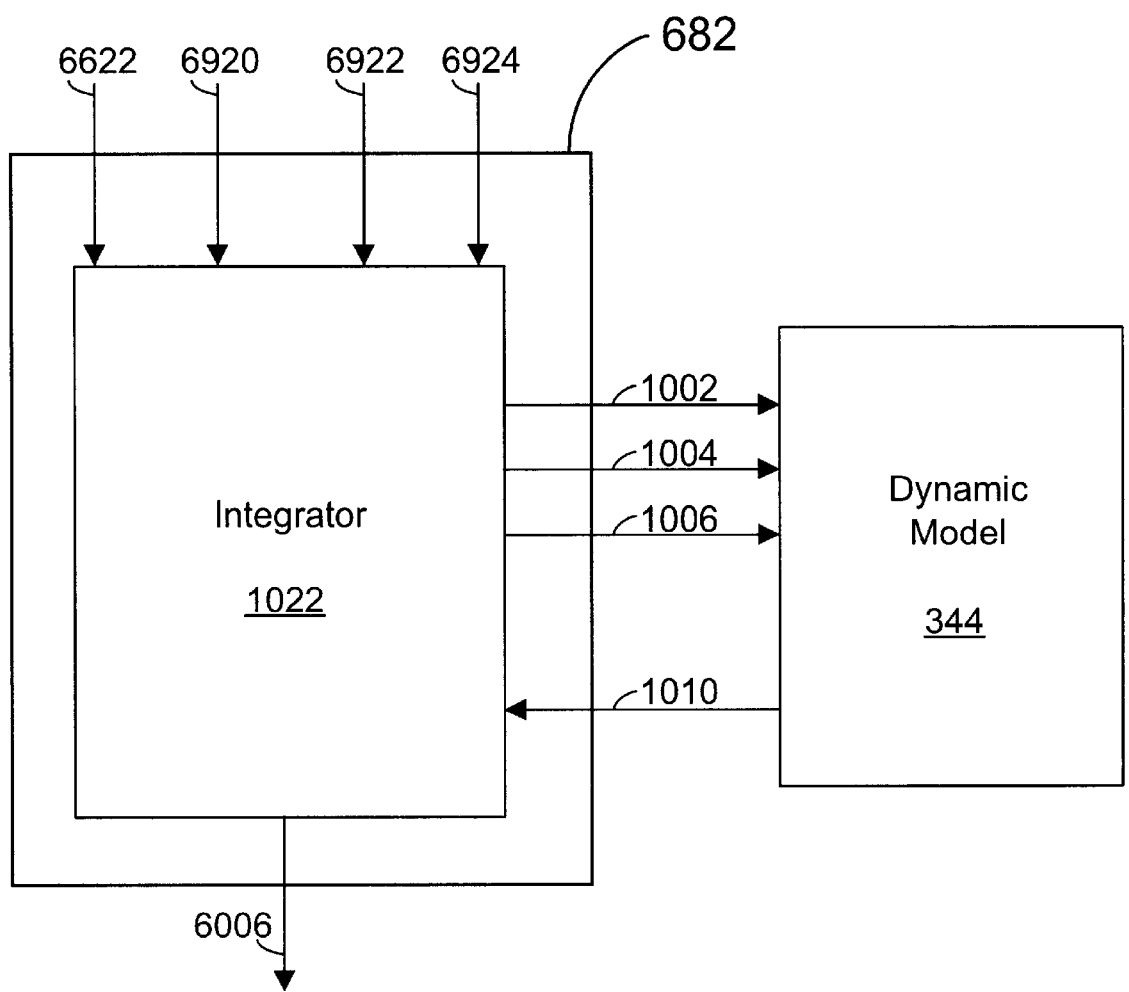
FIGS. 10 and 11 include illustrations of an implementation of a forward dynamic simulator.

Attention is now directed to the simulator 682 as shown in FIG. 10. In one embodiment, the simulator 682 includes a numerical integrator 1022 that can receive the controls 6622, time t 6920, states 6922, and the time increment dt 6924. The process of numerical integration is conventional and has many accepted implementations. Many numerical integrators may make multiple evaluations of the time derivative of the states for each integration time step, each evaluation occurring at some altered time t'=t+δ, where δ can be a number that may be smaller or on the order of dt 6924. The time t' 1002, controls 1004 at time t', and states 1006 at time t' are sent to and received by the dynamic model 344 to determine the time derivatives of the states. The time derivatives of the states 1010 at time t' are sent to and received by the numerical integrator 1022.

These multiple evaluations can be used to make a better approximation of the states at time t+dt. A $4^{th}$ order Runge-Kutta numerical integrator, for example, can make four derivative evaluations in the process of advancing the states at time t to the states at time t+dt. For variable step integrators, the time step, dt, can vary. It may be useful to know the size of the time step during the optimization-based inverse dynamics algorithm previously described. Knowledge of the current size of dt can allow an estimation of the auxiliary states, actuator forces, and external forces at t+dt which can improve the determination of the controls 6622. The outputs 6006 from the simulator 682 can include the states at time t+dt and the time increment dt.

Figure 11:
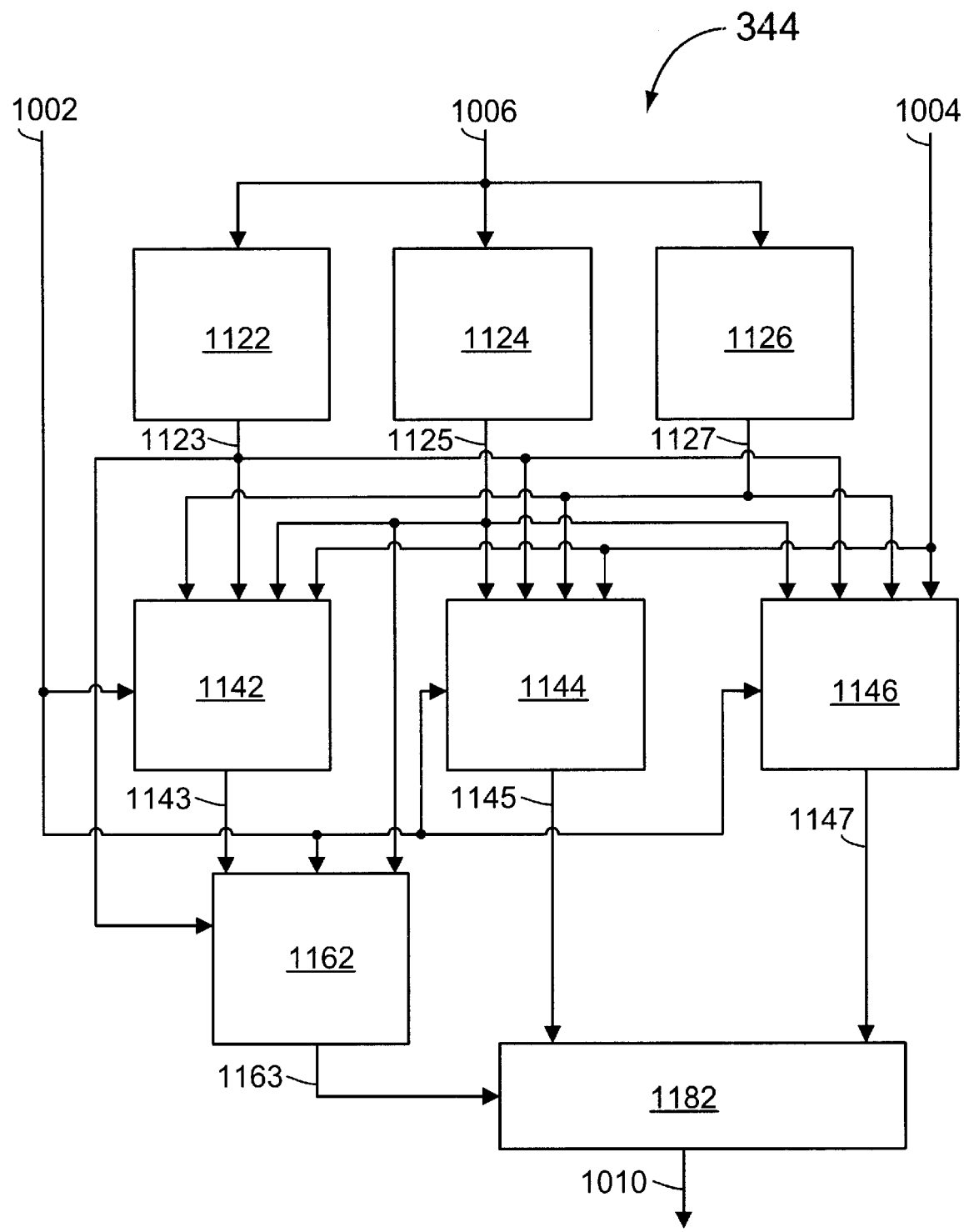

FIG. 11 includes a portion of the dynamic model 344 that can be used to compute time derivatives of the states in conjunction with the numerical integrator 1022. State information 1006 at time t' may be fed into extractor units 1122, 1124, and 1126. Extractor unit 1122 separates the generalized coordinates and speed 1123 from the state information 1006. Extractor unit 1124 separates the actuator forces 1125 from the state information 1006, and extractor unit 1146 separates the auxiliary states 1127 from the state information 1006.

The external forces software unit 1142 may use time t' 1002, the controls 1004 at time t', the generalized coordinates and speeds 1123, actuator forces 1125, and auxiliary states 1127 to calculate the external forces 1143. The external force vector 1143 can be sent to and received by the motion software unit 1162.

The actuator dynamics software unit 1144 can determine 1145, the time derivative of actuator forces ($\dot{F}_A$) Inputs to the unit 1144 may include the time t' 1002, the controls 1004, the generalized coordinates and speeds 1123, the actuator forces 1125, and the auxiliary states 1127. The time derivative of actuator force 1145 can be sent to and received by an assembly unit 1182.

The auxiliary state software unit 1146 can determine the time derivatives of the auxiliary states ($\dot{a}$) 1147. Inputs to the unit 1146 may include the time t' 1002, the controls 1004, the generalized coordinates and speeds 1123, the actuator forces 1125, and the auxiliary states 1127. The time derivative of the auxiliary states 1147 can be sent to and received by the assembly unit 1182.

Software unit 1162 can determine equations of motion using conventional software. Inputs to the unit 1162 may include the time t' 1002, the generalized coordinates and speeds 1123, the actuator forces 1125, and the external forces 1143. The software unit 1162 can determine the accelerations $\ddot{q}$ 1163 at time t'. The accelerations 1163 can be sent to and received by an assembly unit 1182. The assembly unit 1182 assembles the state time derivatives 1010 at time t' and returns that information back to the numerical integrator 1022.

All the equations and calculations performed within the portion of the dynamic model 344 as shown in FIG. 11 are conventional and vary depending on the system of articulated bodies defined in the description 326. However, skilled artisans appreciate this and can use equations and calculations that are tailored for their specific systems.

The data processing system 100 with the software components as described can be used to perform forward dynamics preceded by optimization-based inverse dynamics. Such a system may be useful in the prediction of unspecified generalized coordinates, resolution of redundant control in the context of solving a tracking problem, accounting for dynamic coupling in the equations of motion, or potentially other motion-related problems.

Clearly, the methods and system can be applied quite generally as a means of generating dynamically consistent motion for any system of articulated bodies for which dynamic equations of motion can be derived. Articulated bodies include humans, animals, imaginary creatures, robots, vehicles, space craft, and the like.

The process uses algorithmic components that are synergistically combined and employed. In particular, employing the optimization-based inverse dynamics algorithm in combination with a forward dynamic simulator can allow a)

dynamically infeasible kinematics to be eliminated or filtered from the input kinematics, and b) novel motion to be generated for unspecified generalized coordinates of the equations of motion. Further, by leaving a q unspecified and by specifying a $\Phi_e$ that is a function of the q, an explicit solution of the inverse kinematics problem can by bypassed in favor of solving the inverse kinematic problem implicitly. That is, by tracking $\Phi_e$ values for q will be generated. The methods can be of value to anyone seeking to generate a) dynamically correct motion, b) motion which is achievable within the force generating capabilities of a physical system, c) displacements that cannot be measured accurately, d) novel motion, or the like.

The methods can be useful in the field of medicine. The methods can be used to produce accurate simulations of human kinetics as a means of estimating in-vivo muscle coordination patterns, muscle forces, and joint-contact forces. This information can be valuable for the diagnosis and treatment of movement pathologies and for the design of joint prostheses. In a biomechanics example, generalized forces can contribute to accelerations throughout the articulated linkage, not just to accelerations at joints that they span. Therefore, actuators can globally make up for insufficient accelerations of generalized coordinates they do not directly control. Further, the methods and system may be used in the field of ergonomics, particularly for quantifying repetitive stresses seen in the workplace.

The methods can be used as a computationally feasible method for producing accurate simulations of human or animal kinetics. These simulations can provide improved estimates of a wide range of in-vivo quantities, such as but not limited to, muscle coordination patterns, muscle forces, joint contact forces, and bone loading patterns. These quantities can be used in numerous ways, including:

1. in the study and treatment movement pathologies that arise from neurological trauma such as cerebral palsy, stroke, or the like;
2. in the study and treatment of disease processes which impact the musculoskeletal system such as diabetes, arthritis, or the like;
3. in the design of joint prostheses such as joint and limb replacements, braces, or the like;
4. in the design of sports equipment such as helmets, shoes, rackets, golf clubs, or the like;
5. in the design of suits for altered pressure or gravitational environments such as space, moons, unusual places on Earth, other planets, or the like;
6. in the design of machine-person interfaces such as vehicle or machine controls, or the like;
7. in the design of vehicle safety equipment such as seat belts, air bags, headrests, or the like; or
8. other designs or studies of motion of real or imaginary objects.

The methods can also be useful in the field of computer animation. The methods can be used to enhance the dynamic realism of computer animations that involve the motion of articulated bodies. Given a loose script of the motion a computer animator would like, the methods can be capable of generating motion that is close to the motion scripted by the computer animator but altered in order to conform with the physical laws of classical dynamics.

The methods and system can be used to improve the quality of animations or reduce the time or cost required to produce animations of similar quality. For example, the methods and system can be used:

1. to attenuate or filter errors in motion capture data;
2. to splice discrepant motion-capture or animation sequences together;
3. as an interactive tool for creating dynamically realistic animation sequences; or
4. for representing other systems where physical data for motion of the system cannot be empirically collected.

Note that the methods and system may depart from computed torque control as described herein. The control of a physical device is not intended. Rather, the control of an abstract, mathematical representation of an articulated linkage may constitute the full extent of the control problem. The abstract, mathematical representation of an articulated linkage need not have any correspondence with a real physical system. Rather, the user can be free to create an imaginary articulated linkage possessing exaggerated physical characteristics. The specification of exaggerated physical characteristics can be one of the ways dynamic filtering of motion facilitates a user's achievement of creative or artistic output. Additionally, deviations from the input kinematics may be desired. Whereas in robotics the reduction of trajectory errors is an essential consideration in the design of the robot and in the subsequent control of the robot, a feature of the dynamic filtering methods and system can include the generation of kinematic output that deviates, perhaps substantially, from the kinematic input. These deviations are generated based on the dynamical properties of a specified articulated linkage and dynamical properties of actuators that drive the articulated linkage. Further, control techniques in robotics do not typically contend with redundant control, a trait which is characteristic of the human body.

Skilled artisans appreciate that the methods may use generalized coordinates ($\vec{q}$), other displacements or orientations ($\vec{\Phi}$), or a combination thereof. When working only with generalized coordinates, one of the generalized coordinates may not be specified as part of the kinematic inputs 322. The output information 382 can be generated to provide a value for that unspecified generalized coordinate. When working with $\vec{\Phi}$, a $\Phi i$ may be a function of a generalized coordinate, but the generalized coordinate is not specified as part of the kinematic inputs 322. The output information 382 can be generated to provide a value for that unspecified generalized coordinate.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of filtering motion of a body comprising:

accessing specified kinematics of the body, a dynamic property of the body, and a state of the body;

accessing a filter parameter, wherein the filter parameter is part of a filter parameter set that includes a correction factor and a weight;

determining a desired acceleration using the specified kinematics;

determining a corrected acceleration using the filter parameter, the desired acceleration, and the state;

determining a control pertaining to an actuation of the body using an optimization-based inverse dynamics algorithm, the specified kinematics, and the dynamic property, wherein the corrected acceleration is used during the optimization-based inverse dynamics algorithm; and advancing the state in time using a forward dynamic simulator, the control, the dynamic property, and the state.

2. A method of filtering motion of a body comprising:

accessing specified kinematics of the body, a dynamic property of the body, and a state of the body;

determining a control pertaining to an actuation of the body using an optimization-based inverse dynamics algorithm, the specified kinematics, and the dynamic property, wherein the optimization-based inverse dynamic algorithm comprises:

evaluating a performance criterion using the specified kinematics and the dynamic property; and updating the control so as to minimize or maximize the performance criterion using an optimizer; and advancing the state in time using a forward dynamic simulator, the control, the dynamic property, and the state.

3. A method of filtering motion of a body comprising:

accessing specified kinematics of the body, a dynamic property of the body, and a state of the body;

determining a control pertaining to an actuation of the body using an optimization-based inverse dynamics algorithm, the specified kinematics, and the dynamic property, wherein the optimization-based inverse dynamic algorithm comprises:

evaluating a constraint using the specified kinematics and the dynamic property; and updating the control so as to satisfy the constraint using an optimizer; and advancing the state in time using a forward dynamic simulator, the control, the dynamic property, and the state.

4. A method of filtering motion of a body comprising:

accessing specified kinematics of the body, a dynamic property of the body, and a state of the body;

determining a control pertaining to an actuation of the body using an optimization-based inverse dynamics algorithm, the specified kinematics, and the dynamic property, wherein the optimization-based inverse dynamic algorithm comprises:

estimating a generalize force at time t+dt; and advancing the state in time using a forward dynamic simulator, the control, the dynamic property, and the state.

5. A method of filtering motion of a body comprising:

accessing specified kinematics of the body, a dynamic property of the body, and a state of the body, wherein a generalized coordinate of the body is unspecified at a point in time;

determining a control pertaining to an actuation of the body using an optimization-based inverse dynamics algorithm, the specified kinematics, and the dynamic property; and advancing the state in time using a forward dynamic simulator, the control, the dynamic property, and the state; and generating output information, wherein the output information includes a generated value of the generalized coordinate at the point in time.

6. A method of filtering motion of a body comprising:

accessing specified kinematics of the body, a dynamic property of the body, and a state of the body, wherein:

a q of the body is unspecified at a point in time; and at least some of the specified kinematics comprises a $\Phi$ of the body at the point in time, wherein the $\Phi$ is a function of the q;

determining a control pertaining to an actuation of the body using an optimization-based inverse dynamics algorithm, the specified kinematics, and the dynamic property;

advancing the state in time using a forward dynamic simulator, the control, the dynamic property, and the state; and generating output information, wherein the output information includes a generated value of the q at the point in time.

7. A data processing system readable medium having code embodied therein, the code including instructions executable by a data processing system, wherein the instructions are configured to cause the data processing system to perform a method of filtering motion of a body, the method comprising:

accessing specified kinematics of the body, a dynamic property of the body, and a state of the body;

accessing a filter parameter, wherein the filter parameter is part of a filter parameter set that includes a correction factor and a weight;

determining a desired acceleration using the specified kinematics;

determining a corrected acceleration using the filter parameter, the desired acceleration, and the state;

determining a control pertaining to an actuation of the body using an optimization-based inverse dynamics algorithm, the specified kinematics, and the dynamic property, wherein the corrected acceleration is used during the optimization-based inverse dynamics algorithm; and advancing the state in time using a forward dynamic simulator, the control, the dynamic property, and the state.

8. A data processing system readable medium having code embodied therein, the code including instructions executable by a data processing system, wherein the instructions are configured to cause the data processing system to perform a method of filtering motion of a body, the method comprising:

accessing specified kinematics of the body, a dynamic property of the body, and a state of the body;

determining a control pertaining to an actuation of the body using an optimization-based inverse dynamics algorithm, the specified kinematics, and the dynamic property, wherein the optimization-based inverse dynamic algorithm comprises:
  evaluating a performance criterion using the specified kinematics and the dynamic property; and
  updating the control so as to minimize or maximize the performance criterion using an optimizer; and
advancing the state in time using a forward dynamic simulator, the control, the dynamic property, and the state.

9. A data processing system readable medium having code embodied therein, the code including instructions executable by a data processing system, wherein the instructions are configured to cause the data processing system to perform a method of filtering motion of a body, the method comprising:
  accessing specified kinematics of the body, a dynamic property of the body, and a state of the body;
  determining a control pertaining to an actuation of the body using an optimization-based inverse dynamics algorithm, the specified kinematics, and the dynamic property, wherein the optimization-based inverse dynamic algorithm comprises:
    evaluating a constraint using the specified kinematics and the dynamic property; and
    updating the control so as to satisfy the constraint using an optimizer; and
  advancing the state in time using a forward dynamic simulator, the control, the dynamic property, and the state.

10. A data processing system readable medium having code embodied therein, the code including instructions executable by a data processing system, wherein the instructions are configured to cause the data processing system to perform a method of filtering motion of a body, the method comprising:
  accessing specified kinematics of the body, a dynamic property of the body, and a state of the body;
  determining a control pertaining to an actuation of the body using an optimization-based inverse dynamics algorithm, the specified kinematics, and the dynamic property, wherein the optimization-based inverse dynamic algorithm comprises:
    estimating a generalize force at time t+dt; and
  advancing the state in time using a forward dynamic simulator, the control, the dynamic property, and the state.

11. A data processing system readable medium having code embodied therein, the code including instructions executable by a data processing system, wherein the instructions are configured to cause the data processing system to perform a method of filtering motion of a body, the method comprising:
  accessing specified kinematics of the body, a dynamic property of the body, and a state of the body, wherein a generalized coordinate of the body is unspecified at a point in time;
  determining a control pertaining to an actuation of the body using an optimization-based inverse dynamics algorithm, the specified kinematics, and the dynamic property;
  advancing the state in time using a forward dynamic simulator, the control, the dynamic property, and the state; and
  generating output information, wherein the output information includes a generated value of the generalized coordinate at the point in time.

12. A data processing system readable medium having code embodied therein, the code including instructions executable by a data processing system, wherein the instructions are configured to cause the data processing system to perform a method of filtering motion of a body, the method comprising:
  accessing the specified kinematics accessing specified kinematics of the body, a dynamic property of the body, and a state of the body, wherein:
    a q of the body is unspecified at a point in time; and
    at least some of the specified kinematics comprises a $\Phi$ of the body at the point in time, wherein the $\Phi$ is a function of the q;
  determining a control pertaining to an actuation of the body using an optimization-based inverse dynamics algorithm, the specified kinematics, and the dynamic property;
  advancing the state in time using a forward dynamic simulator, the control, the dynamic property, and the state; and
  generating output information, wherein the output information includes a generated value of the q at the point in time.

13. An article comprising an output information related to a body, wherein the article comprises:
  a data processing system readable medium; and
  a code embodied within the data processing system readable medium, wherein the code includes the output information that is generated by:
    accessing specified kinematics of the body, a dynamic property of the body, and a state of the body;
    accessing a filter parameter, wherein the filter parameter is part of a filter parameter set that includes a correction factor and a weight;
    determining a desired acceleration using the specified kinematics;
    determining a corrected acceleration using the filter parameter, the desired acceleration, and the state;
    determining a control pertaining to an actuation of the body using an optimization-based inverse dynamics algorithm, the specified kinematics, and the dynamic property, wherein the corrected acceleration is used during the optimization-based inverse dynamics algorithm; and
    advancing the state in time using a forward dynamic simulator, the control, the dynamic property, and the state.

14. An article comprising an output information related to a body, wherein the article comprises:
  a data processing system readable medium; and
  a code embodied within the data processing system readable medium, wherein the code includes the output information that is generated by;
  accessing specified kinematics of the body, a dynamic property of the body, and a state of the body;
  determining a control pertaining to an actuation of the body using an optimization-based inverse dynamics algorithm, the specified kinematics, and the dynamic property, wherein the optimization-based inverse dynamic algorithm comprises:
    evaluating a performance criterion using the specified kinematics and the dynamic property; and
    updating the control so as to minimize or maximize the performance criterion using an optimizer; and
  advancing the state in time using a forward dynamic simulator, the control, the dynamic property, and the state.

15. An article comprising an output information related to a body, wherein the article comprises:
- a data processing system readable medium; and
- a code embodied within the data processing system readable medium, wherein the code includes the output information that is generated by:
  - accessing specified kinematics of the body, a dynamic property of the body, and a state of the body;
  - determining a control pertaining to an actuation of the body using an optimization-based inverse dynamics algorithm, the specified kinematics, and the dynamic property, wherein the optimization-based inverse dynamic algorithm comprises:
    - evaluating a constraint using the specified kinematics and the dynamic property; and
    - updating the control so as to satisfy the constraint using an optimizers; and
  - advancing the state in time using a forward dynamic simulator, the control, the dynamic property, and the state.

16. An article comprising an output information related to a body, wherein the article comprises:
- a data processing system readable medium; and
- a code embodied within the data processing system readable medium, wherein the code includes the output information that is generated by:
  - accessing specified kinematics of the body, a dynamic property of the body, and a state of the body;
  - determining a control pertaining to an actuation of the body using an optimization-based inverse dynamics algorithm, the specified kinematics, and the dynamic property, wherein the optimization-based inverse dynamic algorithm comprises:
    - estimating a generalize force at time t+dt; and
  - advancing the state in time using a forward dynamic simulator, the control, the dynamic property, and the state.

17. An article comprising an output information related to a body, wherein the article comprises:
- a data processing system readable medium; and
- a code embodied within the data processing system readable medium, wherein the code includes the output information that is generated by:
  - accessing specified kinematics of the body, a dynamic property of the body, and a state of the body, wherein:
    - the output information is further generated by accessing the specified kinematics, wherein a generalized coordinate of the body is unspecified at a point in time; and
    - the output information includes a generated value of the generalized coordinate at the point in time;
  - determining a control pertaining to an actuation of the body using an optimization-based inverse dynamics algorithm, the specified kinematics, and the dynamic property; and
  - advancing the state in time using a forward dynamic simulator, the control, the dynamic property, and the state.

18. An article comprising an output information related to a body, wherein the article comprises:
- a data processing system readable medium; and
- a code embodied within the data processing system readable medium, wherein the code includes the output information that is generated by:
  - accessing specified kinematics of the body, a dynamic property of the body, and a state of the body, wherein:
    - the output information is further generated by accessing the specified kinematics, wherein:
      - a q of the body is unspecified at a point in time; and
      - at least some of the specified kinematics comprises a $\Phi$ of the body at the point in time, wherein the $\Phi$ is a function of the q; and
    - the output information includes a generated value of the q at the point in time;
  - determining a control pertaining to an actuation of the body using an optimization-based inverse dynamics algorithm, the specified kinematics, and the dynamic property; and
  - advancing the state in time using a forward dynamic simulator, the control, the dynamic property, and the state.

* * * * *